United States Patent
Yamaguchi

(10) Patent No.: US 10,901,213 B2
(45) Date of Patent: Jan. 26, 2021

(54) IMAGE DISPLAY APPARATUS AND IMAGE DISPLAY METHOD

(71) Applicant: CANON KABUSHIKI KAISHA, Tokyo (JP)

(72) Inventor: Hiroichi Yamaguchi, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/374,790

(22) Filed: Apr. 4, 2019

(65) Prior Publication Data

US 2019/0310475 A1    Oct. 10, 2019

(30) Foreign Application Priority Data

Apr. 10, 2018   (JP) .................................. 2018-075619

(51) Int. Cl.
*G02B 27/01*   (2006.01)
*G06T 19/00*   (2011.01)

(52) U.S. Cl.
CPC .......... *G02B 27/017* (2013.01); *G06T 19/006* (2013.01); *G02B 2027/011* (2013.01); *G02B 2027/014* (2013.01)

(58) Field of Classification Search
CPC ............ G02B 27/017; G02B 2027/011; G02B 2027/014; G06T 19/006; G06F 3/012; G06F 3/0304; G06F 3/011
See application file for complete search history.

(56) References Cited

U.S. PATENT DOCUMENTS

| | | | | |
|---|---|---|---|---|
| 10,573,079 | B2 * | 2/2020 | Vembar | G06T 7/70 |
| 2009/0315887 | A1 * | 12/2009 | Yamaguchi | H04N 9/3185 345/428 |
| 2010/0026714 | A1 * | 2/2010 | Utagawa | G06T 19/006 345/633 |
| 2012/0105473 | A1 * | 5/2012 | Bar-Zeev | G06T 7/70 345/633 |
| 2012/0155772 | A1 * | 6/2012 | Yamakawa | G06T 7/246 382/190 |
| 2015/0379772 | A1 * | 12/2015 | Hoffman | G06T 19/006 345/633 |
| 2016/0007849 | A1 * | 1/2016 | Krueger | A61B 5/1128 600/301 |
| 2017/0235380 | A1 * | 8/2017 | Sendai | G06F 3/0487 345/173 |
| 2017/0293356 | A1 * | 10/2017 | Khaderi | G06F 3/147 |
| 2017/0323479 | A1 * | 11/2017 | Mokuya | G06F 3/012 |
| 2017/0329480 | A1 * | 11/2017 | Ishikawa | G06F 3/012 |
| 2019/0064530 | A1 * | 2/2019 | Lee | G02B 27/0179 |

(Continued)

FOREIGN PATENT DOCUMENTS

JP    2015231106 A    12/2015

*Primary Examiner* — Ibrahim A Khan
(74) *Attorney, Agent, or Firm* — Rossi, Kimms & McDowell LLP

(57) ABSTRACT

Whether a similarity between a frame image and an immediately preceding frame image that is a frame image one frame before the frame image is not less than a predetermined value is determined. A corrected frame image in which the frame image is corrected in accordance with the determination result is generated. One of the frame image and the corrected frame image is displayed, according to the determination result, as a display image on a display screen.

16 Claims, 20 Drawing Sheets

(56) References Cited

U.S. PATENT DOCUMENTS

2019/0082089 A1\* 3/2019 Shiohara ............... H04N 13/204
2019/0180499 A1\* 6/2019 Caulfield ................ G06T 15/06
2019/0244582 A1\* 8/2019 Fruchter ................ G06F 3/012
2019/0246094 A1\* 8/2019 Mate ................ H04N 21/44008

\* cited by examiner

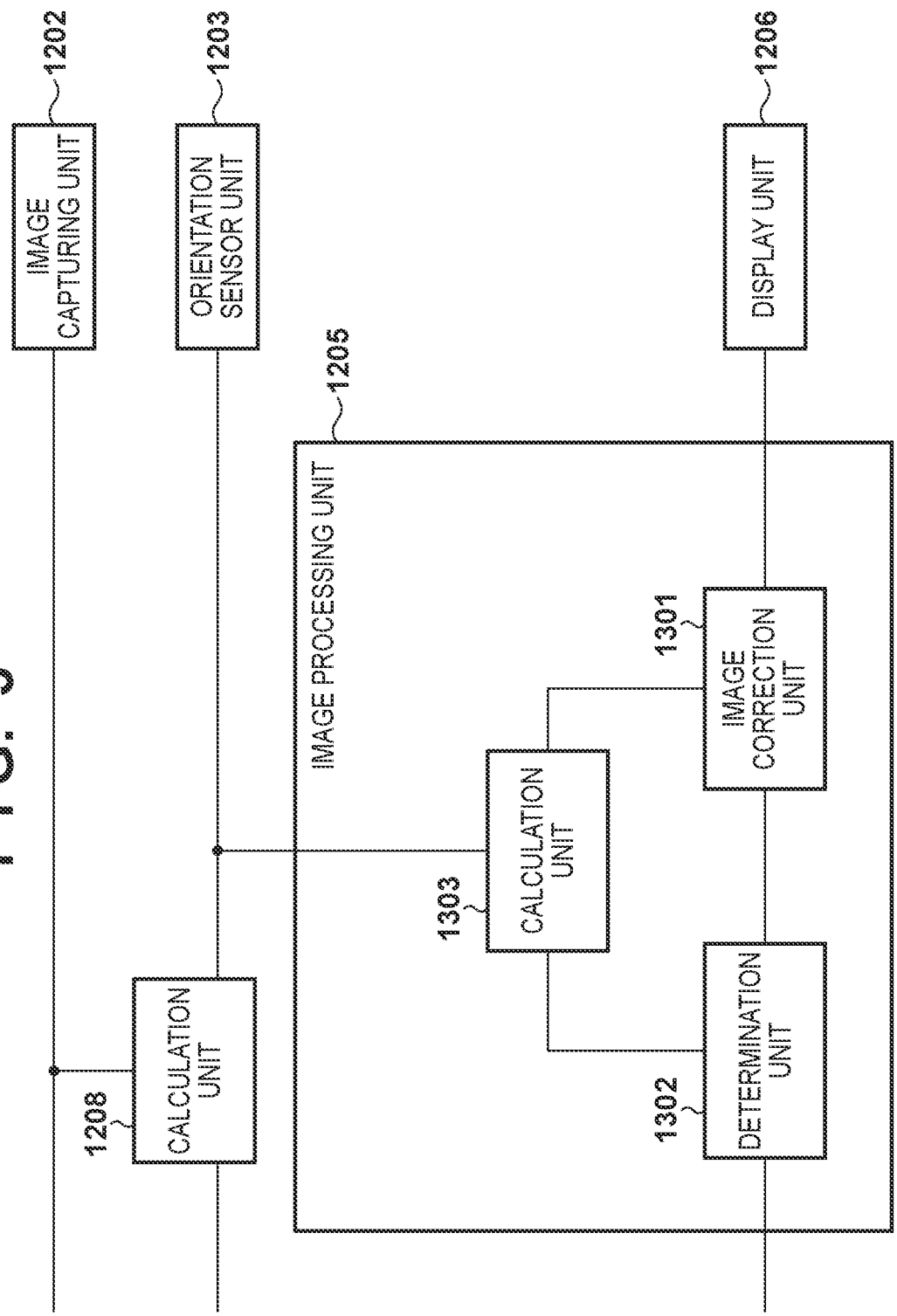

IMAGE WHEN UPDATING RATE LOWERED

IMAGE WHEN CORRECTING

IDEAL IMAGE

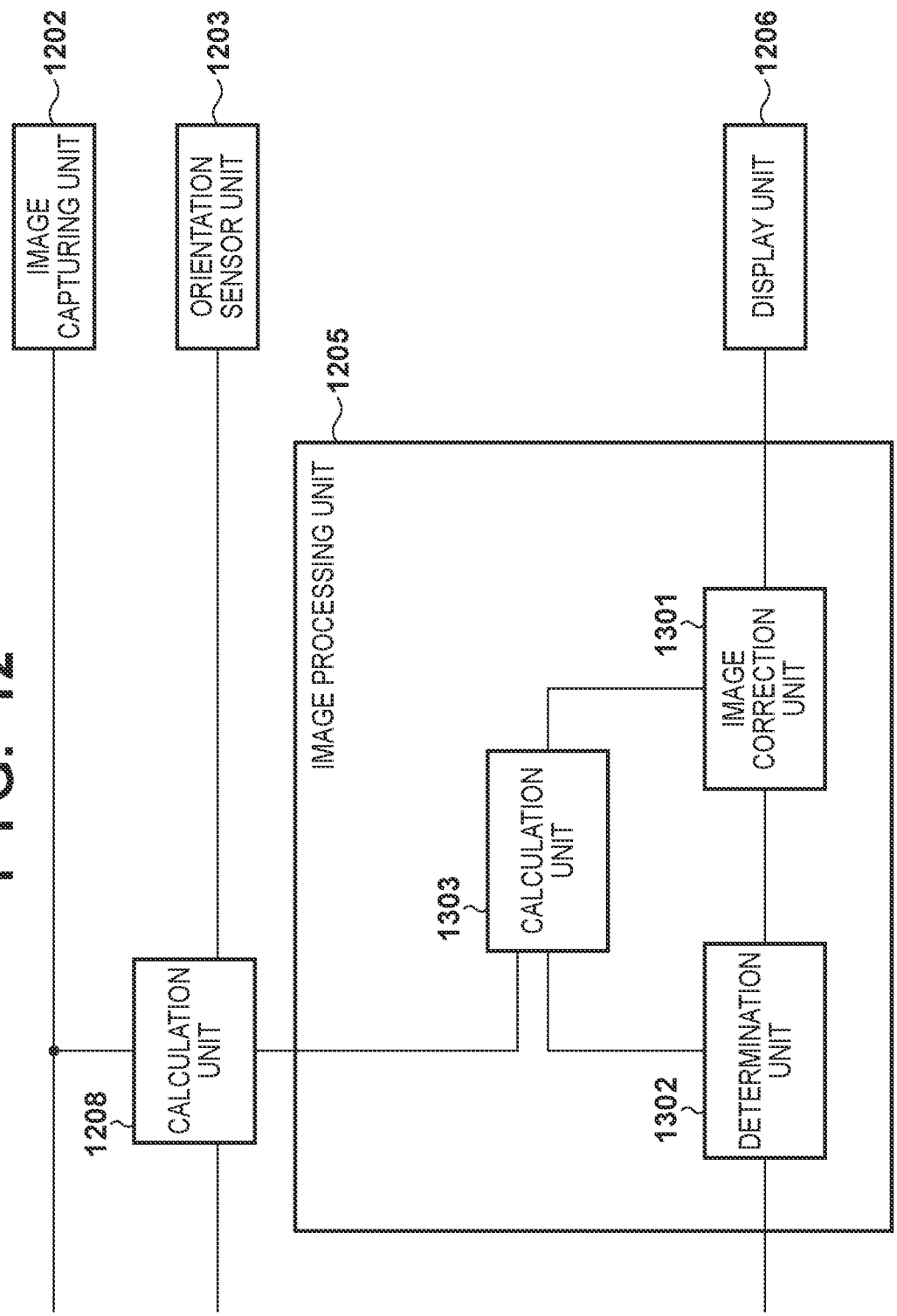

| HMD DISPLAY UNIT UPDATING RATE | MINIMUM DRAWING UPDATING RATE | POST-CALCULATION DRAWING UPDATING RATE |
|---|---|---|
| 60 | 60 OR MORE | 60 |
| | 30 ~ 59 | 30 |
| | 20 ~ 29 | 20 |
| | 15 ~ 19 | 15 |
| | 10 ~ 14 | 10 |

IMAGE DISPLAY APPARATUS AND IMAGE DISPLAY METHOD

BACKGROUND OF THE INVENTION

Field of the Invention

The present invention relates to an image display technique.

Description of the Related Art

In recent years, so-called MR (Mixed Reality) techniques are known as techniques of combining a physical world and a virtual world in real time and seamlessly. As one of the MR techniques, the following technique is known. Using a video see-through type HMD (Head Mounted Display), an object that almost matches an object observed from the pupil position of an HMD user is captured by a video camera or the like. Then, an image formed by superimposing a CG (Computer Graphics) image on a captured image obtained by the image capturing is provided to the HMD user.

The video see-through type HMD is configured to acquire a captured image of an object by capturing the object using a charge coupled device such as a CCD image sensor and present an MR image (mixed reality image) obtained by superimposing a CG image on the captured image to the HMD user via a display device such as a liquid crystal display device or an organic EL display device.

In addition, an external apparatus exists in addition to the HMD, and the image captured by the HMD is transmitted from the HMD to the external apparatus. The external apparatus calculates the position and orientation of the HMD from the captured image received from the HMD, generates a superimposed image by superimposing a CG image on the captured image based on the calculation result, and transmits the superimposed image to the HMD. The HMD displays the superimposed image received from the external apparatus. The HMD user can experience the MR space by attaching the HMD to his/her own head. Japanese Patent Laid-Open No. 2015-231106 describes a technique of correcting an image to be displayed, based on the position and orientation of the head of an HMD user, and displaying the image.

Japanese Patent Laid-Open No. 2015-231106 describes that an image to be displayed is corrected based on the position and orientation of the head of an HMD user and displayed, thereby reducing the delay amount of the system and reducing visually induced motion sickness. In this technique, however, if the updating rate of the display image varies because of a delay of display image drawing processing, the user sometimes suffers visually induced motion sickness.

SUMMARY OF THE INVENTION

The present invention provides a technique for reducing visually induced motion sickness of an observer who observes a display image even in a case in which drawing of the display image delays.

According to the first aspect of the present invention, there is provided an image display apparatus comprising: a determination unit configured to determine whether a similarity between a frame image and an immediately preceding frame image that is a frame image one frame before the frame image is not less than a predetermined value; a generation unit configured to generate a corrected frame image in which the frame image is corrected in accordance with a determination result by the determination unit; and a display control unit configured to display one of the frame image and the corrected frame image, according to the determination result of the determination unit, as a display image on a display screen of the image display apparatus.

According to the second aspect of the present invention, there is provided an image display apparatus comprising: a decision unit configured to decide a frame image of a correction target in frame images transmitted from an external apparatus, based on a drawing rate of the frame image in the external apparatus; a generation unit configured to generate a corrected frame image in which the frame image of the correction target is corrected in accordance with the drawing rate; and a display control unit configured to display a frame image that is not the correction target in the frame images transmitted from the external apparatus and the corrected frame image as display images on a display screen of the image display apparatus.

According to the third aspect of the present invention, there is provided an image display method performed by an image display apparatus, comprising: determining whether a similarity between a frame image and an immediately preceding frame image that is a frame image one frame before the frame image is not less than a predetermined value; generating a corrected frame image in which the frame image is corrected in accordance with a determination result in the determining; and displaying one of the frame image and the corrected frame image, according to the determination result of the determining, as a display image on a display screen of the image display apparatus.

According to the fourth aspect of the present invention, there is provided an image display method performed by an image display apparatus, comprising: deciding a frame image of a correction target in frame images transmitted from an external apparatus, based on a drawing rate of the frame image in the external apparatus; generating a corrected frame image in which the frame image of the correction target is corrected in accordance with the drawing rate; and displaying a frame image that is not the correction target in the frame images transmitted from the external apparatus and the corrected frame image as display images on a display screen of the image display apparatus.

Further features of the present invention will become apparent from the following description of exemplary embodiments (with reference to the attached drawings).

BRIEF DESCRIPTION OF THE DRAWINGS

FIG. 3 is a block diagram showing an example of the functional arrangement of an image processing unit 1205;

FIG. 12 is a block diagram showing an example of the functional arrangement of an image processing unit 1205;

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

First Embodiment

In this embodiment, a system configured to present a composite image (an image of a mixed reality space) of an image of a physical space and an image of a virtual space to a head mounted type display apparatus will be described. The system according to this embodiment reduces a variation in the updating rate of display of a composite image in the head mounted type display apparatus caused by a delay of generation of the composite image or transmission of the composite image to the head mounted type display apparatus.

Figure 1:
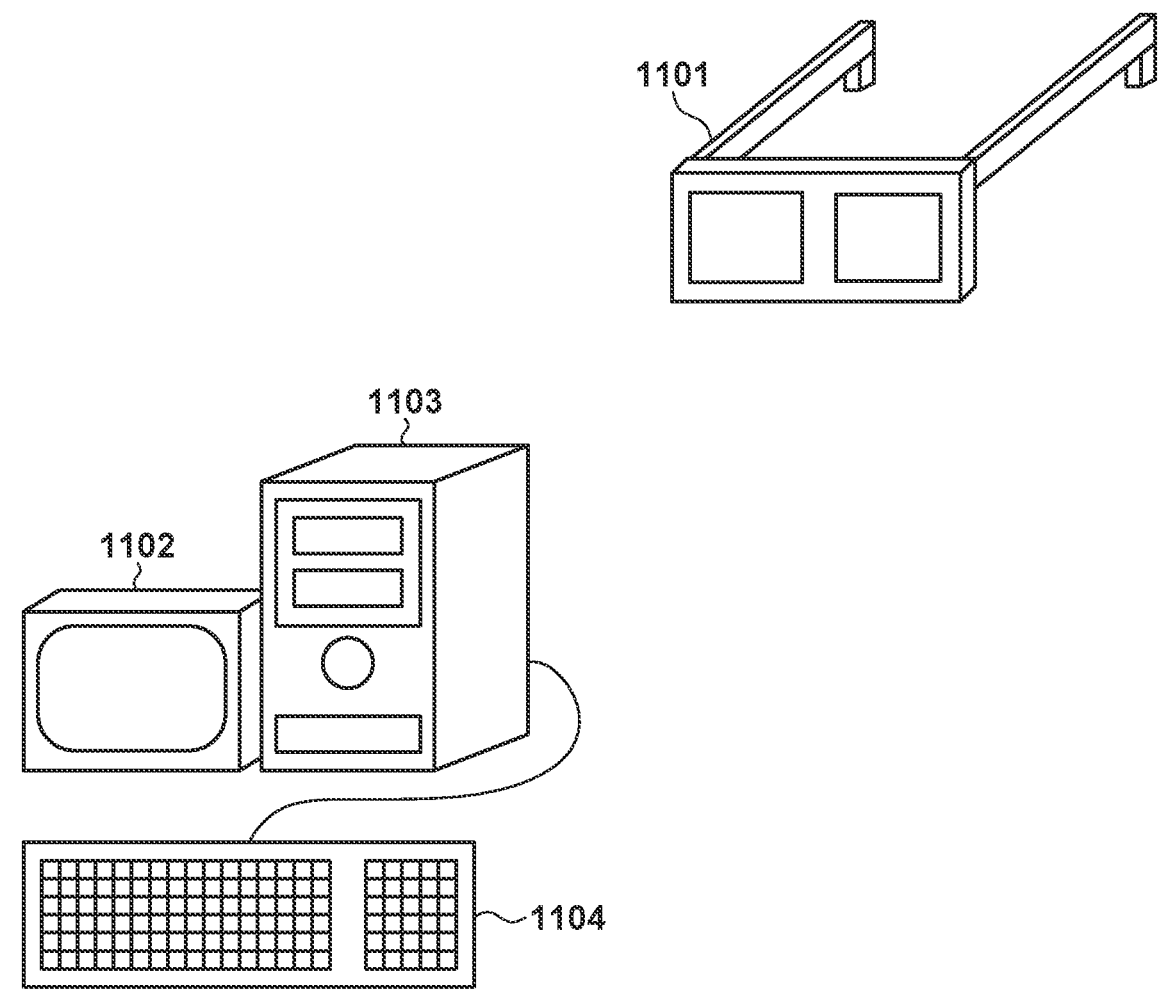
FIG. 1 is a view showing an example of the arrangement of a system.

An example of the arrangement of the system according to this embodiment will be described first with reference to FIG. 1. As shown in FIG. 1, the system according to this embodiment includes an HMD 1101, a display apparatus 1102, an image processing apparatus 1103, and an operation device 1104. The HMD 1101 and the image processing apparatus 1103 are configured to be able to perform data communication with each other via a wireless and/or wired network. As the wireless network between the HMD 1101 and the image processing apparatus 1103, for example, a WLAN (Wireless Local Area Network) or a WPAN (Wireless Personal Area Network) can be applied. Note that the HMD 1101 and the image processing apparatus 1103 may perform data communication with each other via one or more communication devices. In addition, the display apparatus 1102 and the operation device 1104 are connected to the image processing apparatus 1103.

In this embodiment, a case in which the HMD 1101 is used as an example of the head mounted type display apparatus will be described. However, a head mounted type display apparatus other than the HMD 1101 may be used. In addition, not the head mounted type display apparatus but an image display apparatus of another type such as a hand held type display apparatus may be used.

Figure 2:
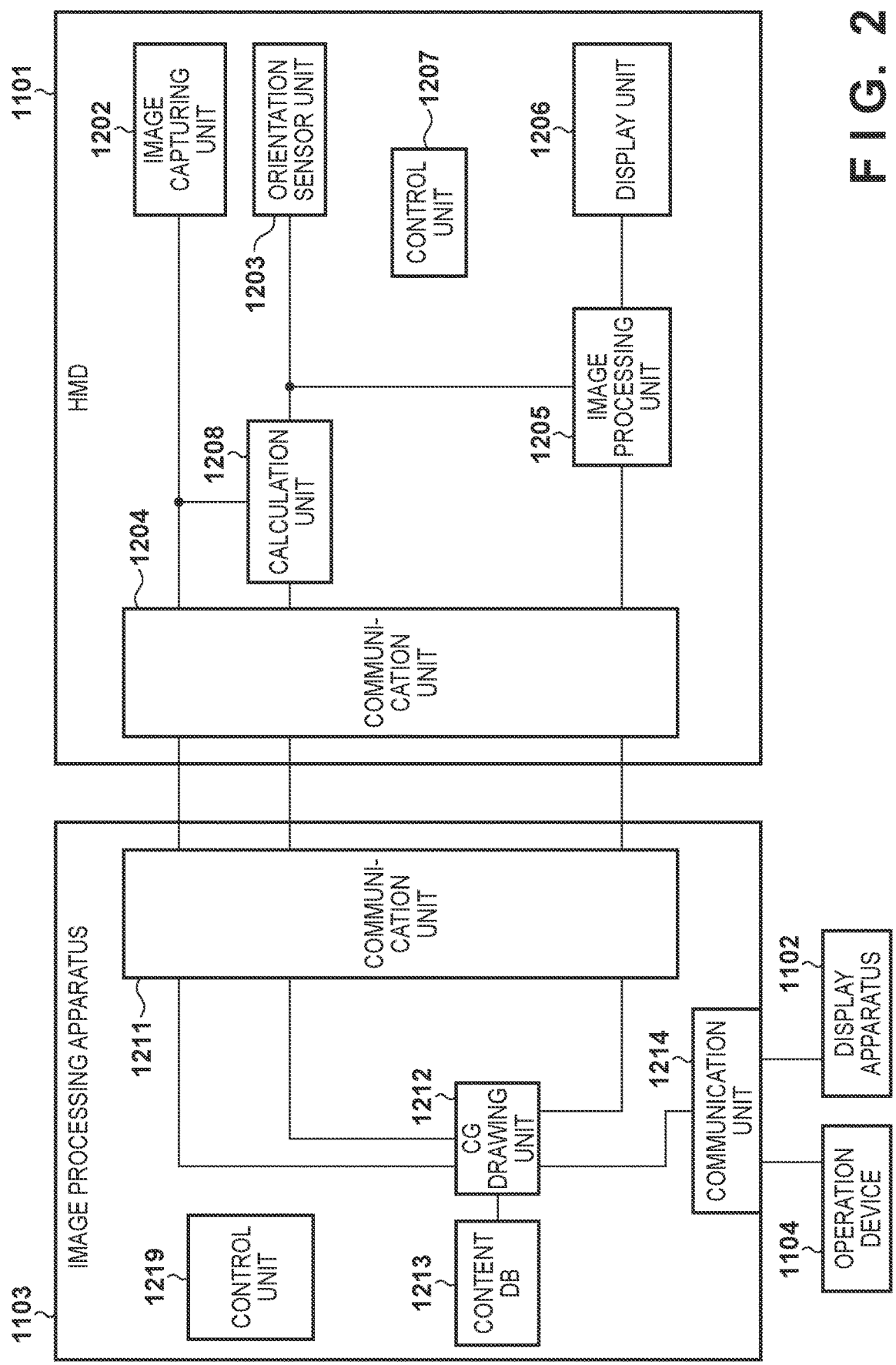
FIG. 2 is a block diagram showing an example of the functional arrangement of each of an HMD 1101 and an image processing apparatus 1103.

An example of the functional arrangement of each of the HMD 1101 and the image processing apparatus 1103 will be described next with reference to the block diagram of FIG. 2. The HMD 1101 will be described first. An image capturing unit 1202 captures a moving image of the physical space and sequentially transmits the image (the captured image of the physical space) of each frame of the captured moving image to the image processing apparatus 1103 that is an external apparatus via a communication unit 1204, and also outputs the image to a calculation unit 1208. The image capturing unit 1202 is attached to the HMD 1101 so as to be located, for example, near the eyes of a user (to be sometimes referred to as an HMD user hereinafter) who wears the HMD 1101 on his/her head.

An orientation sensor unit 1203 is a sensor such as a gyro sensor. The orientation sensor unit 1203 measures "orientation information (for example, quaternion) representing the orientation of its own" and "the angular velocity of its own about each of the axes (x-, y-, and z-axes) of a local coordinate system based on the position and orientation of its own". The orientation information and the angular velocity measured by the orientation sensor unit 1203 will sometimes be referred to as the orientation information and the angular velocity of the HMD 1101, respectively, hereinafter.

Note that the orientation sensor unit 1203 need not always measure all of the orientation information and the angular velocities of its own. At least one of these may be measured, or another information concerning the sensor itself such as the position of its own may be measured in place of or in addition to these.

The calculation unit 1208 acquires the captured image obtained by the image capturing unit 1202 and the orientation information obtained by the orientation sensor unit 1203. The calculation unit 1208 then calculates, based on the acquired captured image, the position of the image capturing unit 1202 at the time of capturing of the image. The technique for calculating, based on a captured image, the position of an image capturing device that has captured the image is known, and any technique can be employed in this embodiment. For example, a technique of calculating the position of the image capturing device that has captured the image based on the three-dimensional position, in the physical space, of a feature (an edge or a corner of a physical object) whose position is known in the physical space and the image coordinates (two-dimensional coordinates) of the feature in the captured image may be employed.

Alternatively, the position of the image capturing device may be acquired based on a measured value obtained by a position sensor attached to the image capturing device or a head mounted type display apparatus including the image capturing device. The position of the image capturing device may be acquired using a GPS. That is, the calculation unit 1208 can apply any technique as long as the position of the image capturing unit 1202 at the time of capturing of the image can be acquired. In addition, the calculation unit 1208 converts the orientation of the orientation sensor unit 1203 represented by the acquired orientation information using the relative orientation relationship between the image capturing unit 1202 and the orientation sensor unit 1203. Note that the relative orientation relationship between the image capturing unit 1202 and the orientation sensor unit 1203 is known information and is registered in advance in the internal memory (for example, a memory provided in a control unit 1207) of the HMD 1101. The orientation of the image capturing unit 1202 can be obtained by this conversion. Note that the arrangement for acquiring the orientation of the image capturing unit 1202 is not limited to a specific arrangement, and, for example, the orientation of the image capturing unit 1202 at the time of capturing of the image may be obtained from the captured image using the above-described known method. Then, the calculation unit 1208 transmits the obtained position and orientation of the image capturing unit 1202 to the image processing apparatus 1103 via the communication unit 1204. A display unit 1206 is attached to the HMD 1101 so as to be located in front of the eyes of the HMD user, and displays an image or characters output from an image processing unit 1205.

The image processing unit 1205 determines whether the similarity between a composite image (frame image) received from the image processing apparatus 1103 via the communication unit 1204 and a composite image (immediately preceding frame image) received from the image processing apparatus 1103 immediately before the composite image is a predetermined value or more. Of the composite image received from the image processing apparatus 1103 and a shifted composite image (shift frame image) in which each pixel of the composite image is shifted, the image processing unit 1205 outputs one image according to the result of above-described determination as a display image to the display unit 1206. Accordingly, the display image is displayed on the display screen of the display unit 1206. Details of the image processing unit 1205 will be described later.

The control unit 1207 includes a processor such as a CPU, and a memory that stores data and computer programs to be executed by the processor. The processor executes processing using the data and the computer programs in the memory, thereby controlling the operation of the entire HMD 1101 and executing or controlling processing to be described later as processing to be performed by the HMD 1101. The communication unit 1204 functions as an interface configured to perform data communication with the image processing apparatus 1103.

The image processing apparatus 1103 will be described next. The image processing apparatus 1103 is a computer apparatus such as a PC (Personal Computer), a WS (Work-Station), a tablet terminal, or a smartphone. A communication unit 1211 functions as an interface configured to perform data communication with the HMD 1101.

A CG drawing unit 1212 constructs a virtual object using virtual object data registered in a content DB 1213, and arranges the constructed virtual object in the virtual space at a position and orientation defined by the virtual object data. The virtual object data includes model data that defines the outer appearance of the virtual object such as the geometric shape, color, feel, and texture of the virtual object, data representing the position and orientation to arrange the virtual object, and data concerning a light source that irradiates the virtual space.

The CG drawing unit 1212 generates, as a virtual space image, an image of the virtual object viewed from a viewpoint (the position of the viewpoint is the position of the image capturing unit 1202, and the orientation of the viewpoint is the orientation of the image capturing unit 1202). Both the position and orientation of the image capturing unit 1202 are received from the HMD 1101 (calculation unit 1208) via the communication unit 1211. The CG drawing unit 1212 generates a composite image (mixed reality image) in which the captured image received from the HMD 1101 (image capturing unit 1202) via the communication unit 1211 and the generated virtual space image are composited. The CG drawing unit 1212 transmits the generated composite image to the HMD 1101 via the communication unit 1211.

A control unit 1219 includes a processor such as a CPU, and a memory that stores data and computer programs to be executed by the processor. The processor executes processing using the data and the computer programs in the memory, thereby controlling the operation of the entire image processing apparatus 1103 and executing or controlling processing to be described later as processing to be performed by the image processing apparatus 1103. A communication unit 1214 functions as an interface configured to connect the operation device 1104 and the display apparatus 1102 to the image processing apparatus 1103.

The operation device 1104 will be described next. The operation device 1104 is formed by a user interface such as a keyboard, and the user can input various kinds of instructions by operating the operation device 1104. The user interface is not limited to a keyboard, and may be a user interface of another type such as a mouse or a touch panel. An instruction input by the operation of the user is input to the image processing apparatus 1103 via the communication unit 1214, and the control unit 1219 executes processing according to the instruction.

The display apparatus 1102 will be described next. The display apparatus 1102 is formed by a CRT, a liquid crystal screen, or the like, and can display a result of processing by the image processing apparatus 1103 as an image or characters. For example, the display apparatus 1102 can display an image to be output from the image processing apparatus 1103 to the HMD 1101. Alternatively, the display apparatus 1102 may display an image that is a display image on the HMD 1101. Note that the display apparatus 1102 may be a touch panel screen.

All the functional units of the image processing apparatus 1103 may be implemented by hardware. However, the CG drawing unit 1212 may be implemented by software (computer program). In the latter case, the computer program is stored in a memory such as the content DB 1213. The control unit 1219 executes processing using the computer program, thereby implementing the function of the CG drawing unit 1212.

An example of the functional arrangement of the image processing unit 1205 will be described next with reference to the block diagram of FIG. 3. A determination unit 1302 determines whether the similarity between a composite image received from the image processing apparatus 1103 and a composite image (one frame before the composite image) received from the image processing apparatus 1103 immediately before the composite image is a predetermined value or more. There are various methods of obtaining the similarity between the composite images.

Figure 7A:
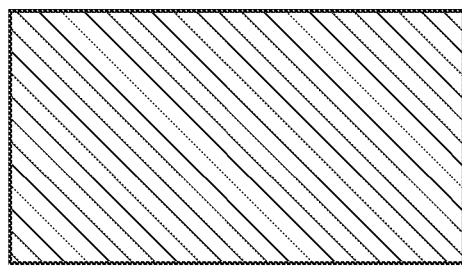
FIGS. 7A to 7D are views for explaining a method of obtaining the similarity between composite images.

For example, as shown in FIG. 7A, the whole region (the region indicated by hatching) of a composite image 1233 (two composite images to be compared) is set to a comparison target region, and the similarity between the comparison target region of one composite image and the comparison target region of the other composite image is obtained. The similarity between the regions may be, for example, the sum (total difference value) of the differences (the absolute values of differences, the squares of differences, or the like) of pixel values at corresponding pixel positions in the regions. As the pixel value, the pixel values of R, G, and B color components may be used, or the pixel value of a specific color component may be used. When using the pixel values of R, G, and B color components, a value obtained by totaling the total difference values of the R, G, and B color components may be used as the similarity.

Figure 7B:
Figure 7C:
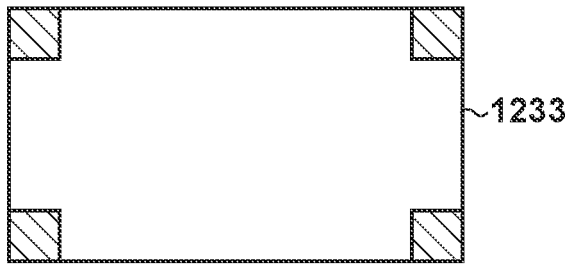
Figure 7D:
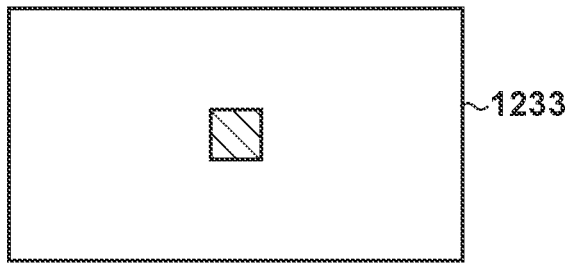

Note that various modifications can be considered as for which region in the composite image is set as the comparison target region. For example, as shown in FIG. 7B, the region (the region indicated by hatching) at the upper left corner of the composite image 1233 (two composite images to be compared) may be set to the comparison target region. For example, as shown in FIG. 7C, the regions (the regions indicated by hatching) at the four corners of the composite image 1233 (two composite images to be compared) may be set to the comparison target regions. For example, as shown in FIG. 7D, the region (the region indicated by hatching) at the center of the composite image 1233 (two composite images to be compared) may be set to the comparison target region.

If the similarity between the composite images is the predetermined value or more, the determination unit 1302 determines that the composite images are similar (or are the same). If the similarity between the composite images is less than the predetermined value, the determination unit 1302 determines that the composite images are not similar (or are different).

Note that the determination unit 1302 need only determine whether the composite image received from the image processing apparatus 1103 and the composite image received from the image processing apparatus 1103 immediately before the composite image are similar (including "are the same"), and the method therefor is not limited to a specific method. For example, assume that when the CG drawing unit 1212 generates a composite image, a frame number unique to the composite image is added to the generated composite image, and the composite image is transmitted to the HMD 1101. At this time, the determination unit 1302 determines whether the frame number of the composite image received from the image processing apparatus 1103 and the frame number of the composite image received from the image processing apparatus 1103 immediately before the composite image are the same. If the frame number of the composite image received from the image processing apparatus 1103 and the frame number of the composite image received from the image processing apparatus 1103 immediately before the composite image are the same, the determination unit 1302 determines that the composite images are the same. On the other hand, if the frame number of the composite image received from the image processing apparatus 1103 and the frame number of the composite image received from the image processing apparatus 1103 immediately before the composite image are not the same, the determination unit 1302 determines that the composite images are not the same.

A calculation unit 1303 acquires and holds an angular velocity output from the orientation sensor unit 1203 every time the image capturing unit 1202 captures an image. That is, the calculation unit 1303 holds the history of past angular velocities. An angular velocity corresponding to a captured image of interest is an angular velocity corresponding to a composite image generated using the captured image of interest. Based on angular velocities in a number according to the result of determination of the determination unit 1302 in the held angular velocities, the calculation unit 1303 obtains the shift amount of "each pixel of the composite image received from the image processing apparatus 1103".

Upon determining that it is necessary to correct a composite image, an image correction unit 1301 generates a shifted composite image in which each pixel of the composite image is shifted by the shift amount obtained for the composite image by the calculation unit 1303, and outputs the shifted composite image as a display image to the display unit 1206. On the other hand, upon determining that it is not necessary to correct a composite image, the image correction unit 1301 outputs the composite image as a display image to the display unit 1206. Details of the operations of the determination unit 1302, the calculation unit 1303, and the image correction unit 1301 will be described later.

Composite images transmitted from the image processing apparatus 1103 to the HMD 1101 during a change of the orientation of the HMD 1101 and a composite image displayed on the display unit 1206 will be described next with reference to FIGS. 4A to 4E.

Figure 4A:
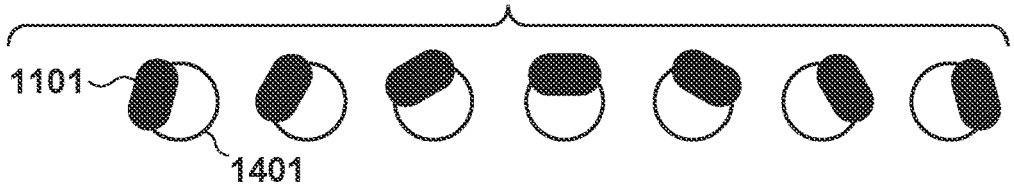
FIGS. 4A to 4E are views for explaining the first embodiment.

FIG. 4A shows a state (uniform motion) in which the direction (azimuth) of the HMD 1101 attached to the head 1401 of an HMD user is changing. The direction of the HMD 1101 rotates clockwise from the state shown at the left end of FIG. 4A and changes to the state shown at the right end of FIG. 4A.

Figure 4B:
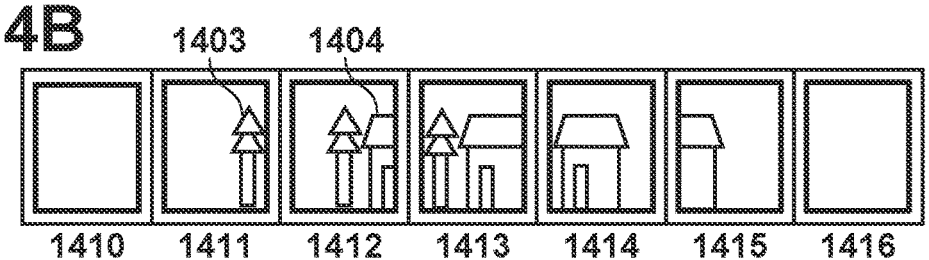

FIG. 4B shows composite images corresponding to the directions of the HMD 1101 shown in FIG. 4A. That is, composite images 1410 to 1416 are composite images corresponding to the directions of the HMD 1101 shown from the left end to the right end of FIG. 4A. For example, in a case in which the direction of the HMD 1101 is the direction of the HMD 1101 shown at the left end of FIG. 4A, the composite image that should be displayed on the HMD 1101 as the composite image corresponding to the direction is the composite image 1410. In addition, for example, in a case in which the direction of the HMD 1101 is the direction of the HMD 1101 shown at the second position from the left end of FIG. 4A, the composite image that should be displayed on the HMD 1101 as the composite image corresponding to the direction is the composite image 1411. Also, for example, in a case in which the direction of the HMD 1101 is the direction of the HMD 1101 shown at the right end of FIG. 4A, the composite image that should be displayed on the HMD 1101 as the composite image corresponding to the direction is the composite image 1416. Reference numerals 1403 and 1404 denote objects (physical objects or virtual objects) included in the composite images.

Figure 4C:
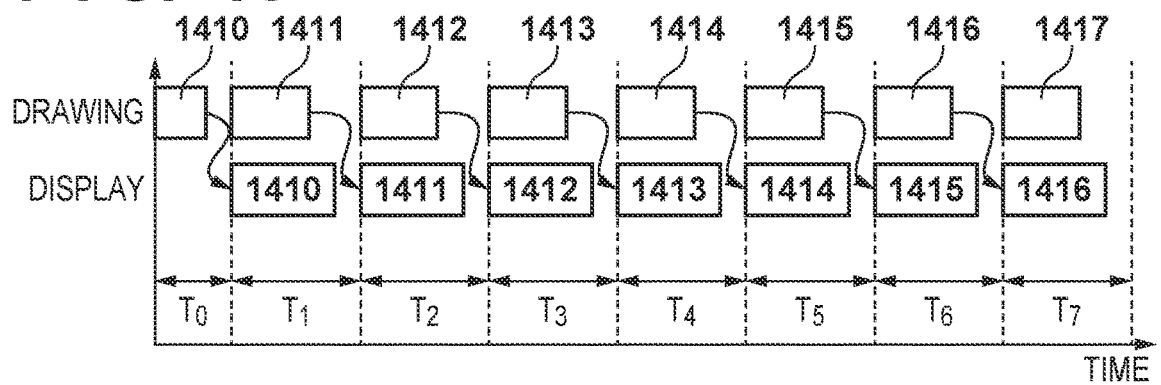

FIG. 4C shows the drawing period (a period from the start of generation of a composite image by the CG drawing unit 1212 to output to the HMD 1101) of each of the composite images 1410 to 1417 shown in FIG. 4B, and the display period of each of the composite images 1410 to 1416 shown in FIG. 4B on the HMD 1101. T1 to T7 represent display periods of the composite images 1410 to 1416. For example, T1 represents the display period of the composite image 1410 shown in FIG. 4A. Note that in the subsequent drawings including FIGS. 4C and 4E, display periods are illustrated shorter than the period lengths represented by T1 to T7 for the sake of various kinds of illustrations. As described above, when generation of a composite image is completed, the CG drawing unit 1212 transmits the generated composite image to the HMD 1101. As shown in FIG. 4C, since the CG drawing unit 1212 completes generation of each of the composite images 1410 to 1416 until the display timing of the composite image, the composite images 1410 to 1416 are sequentially displayed without missing or redundancy. For example, as shown in FIGS. 4B and 4C, the composite image 1411 whose generation is completed until the display period T2 is displayed on the display unit 1206 in the display period T2, and the composite image 1412 whose generation is completed until the display period T3 is displayed on the display unit 1206 in the display period T3.

As described above, in the example shown in FIGS. 4B and 4C, since there is no delay in the generation of each of the composite images 1410 to 1416 (generation of each composite image is completed until the display timing of the composite image), the composite images 1410 to 1416 are displayed on the HMD 1101 without missing or redundancy. Hence, for example, in a case in which the direction of the HMD 1101 is the direction shown at the left end of FIG. 4A, the HMD user can observe the composite image 1410 corresponding to it. In addition, for example, in a case in which the direction of the HMD 1101 is the direction shown at the right end of FIG. 4A, the HMD user can observe the composite image 1416 corresponding to it.

Figure 4D:
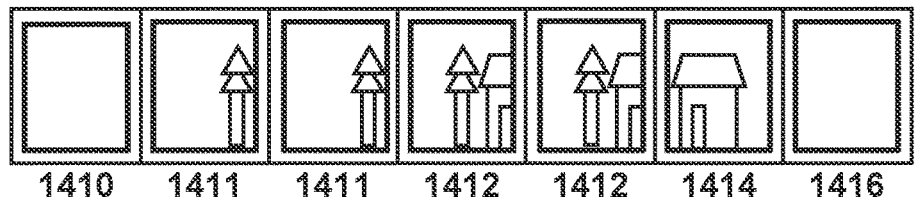

FIG. 4D shows composite images displayed on the HMD 1101 in a case in which "generation of a composite image is not completed until the display timing of the composite image" for the composite images 1412 and 1414 in the composite images 1410 to 1416.

Figure 4E:
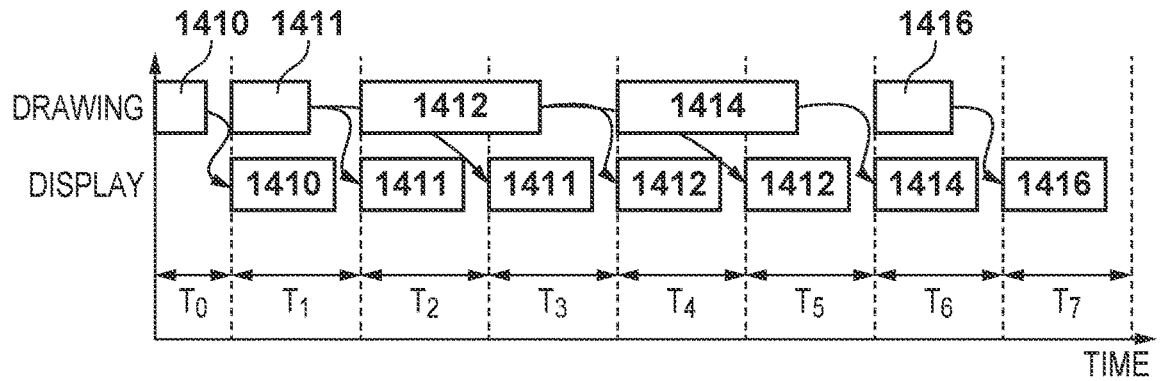

FIG. 4E shows the drawing period of the composite images 1410, 1411, 1412, 1414, and 1416 shown in FIG. 4D and the display periods of the composite images 1410, 1411, 1412, 1414, and 1416 shown in FIG. 4D on the HMD 1101. As shown in FIGS. 4D and 4E, as for each of the composite images 1410 and 1411, the generation is completed until the display timing, as in FIG. 4B. For this reason, the composite image 1410 is displayed on the display unit 1206 in the display period T1 as the composite image corresponding to the direction of the HMD 1101 corresponding to the left end of FIG. 4A. In addition, the composite image 1411 is displayed on the display unit 1206 in the display period T2 as the composite image corresponding to the direction of the HMD 1101 corresponding to the second position from the left end of FIG. 4A. However, as shown in FIG. 4E, a delay occurs in the generation of the composite image 1412. The generation is not completed until the start of the display period T3 and is completed halfway through the display period T3. For this reason, the CG drawing unit 1212 cannot transmit the composite image 1412 to the HMD 1101 until the start of the display period T3, and instead, transmits the previously generated composite image 1411 to the HMD 1101. As a result, the composite image 1411 is continuously displayed in both of the display periods T2 and T3. At this time, the updating rate of the display of the composite image lowers. This lowering of the updating rate may make some HMD users feel uncomfortable and may cause visually induced motion sickness. When the generation of the composite image 1412 is completed, the composite image 1412 is transmitted to the HMD 1101 and displayed on the display unit 1206 in the display period T4. Simultaneously, generation of not the composite image 1413 whose display period overlaps due to the above-described delay but the composite image 1414 is started. In addition, as shown in FIG. 4E, a delay occurs in the generation of the composite image 1414. The generation is not completed until the start of the display period T5 and is completed halfway through the display period T5. For this reason, the CG drawing unit 1212 cannot transmit the composite image 1414 to the HMD 1101 until the start of the display period T5, and instead, transmits the previously generated composite image 1412 to the HMD 1101. As a result, the composite image 1412 is continuously displayed in both of the display periods T4 and T5. When the generation of the composite image 1414 is completed, the composite image 1414 is transmitted to the HMD 1101 and displayed on the display unit 1206 in the display period T6. Simultaneously, generation of not the composite image 1415 whose display period overlaps due to the above-described delay but the composite image 1416 is started.

In this embodiment, even if generation of a certain composite image delays, display control of the composite image to reduce the influence of the delay is performed. The operation of the image processing unit 1205 for this will be described with reference to an example shown in FIGS. 5A to 5E.

Figure 5A:
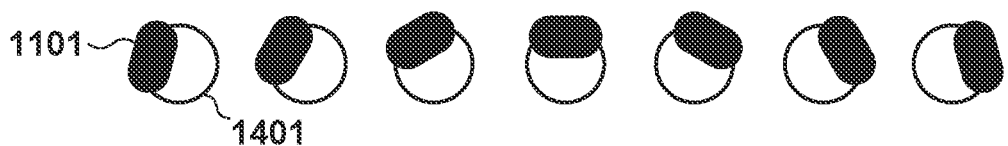
FIGS. 5A to 5E are views for explaining the operation of the image processing unit 1205.
Figure 5B:
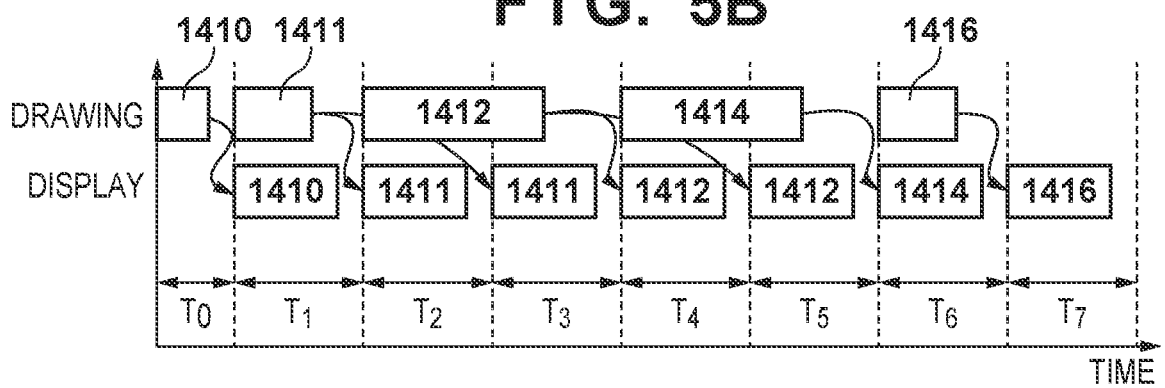

FIG. 5A shows a state in which the direction (azimuth) of the HMD 1101 attached to the head 1401 of the HMD user is changing, like FIG. 4A. FIG. 5B shows the drawing period of each of the composite images 1410, 1411, 1412, 1414, and 1416 and the display period of each of the composite images 1410, 1411, 1412, 1414, and 1416 on the HMD 1101 in a case in which "generation of a composite image is not completed until the display timing of the composite image" for the composite images 1412 and 1414 in the composite images 1410 to 1416, like FIG. 4E.

Figure 5C:
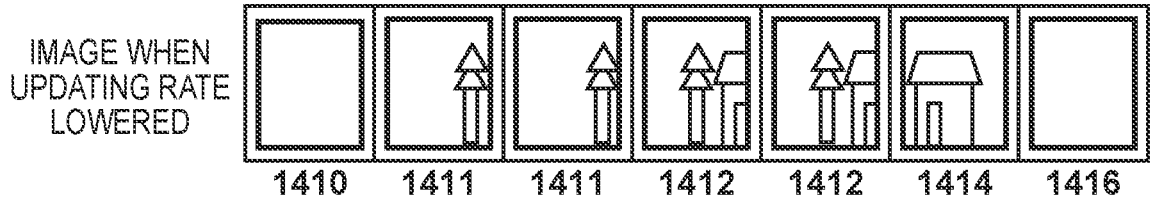

FIG. 5C shows composite images displayed on the HMD 1101 in a case in which "generation of a composite image is not completed until the display timing of the composite image" for the composite images 1412 and 1414 in the composite images 1410 to 1416, like FIG. 4D.

In this embodiment, in a case in which the composite images 1410, 1411, 1412, 1414, and 1416 as shown in FIG. 5C are received in this order, the display images are acquired and displayed on the display unit 1206 by the following processing. Note that a count value used below is assumed to be already initialized to 0 at the point of time of receiving the composite image 1410.

Upon receiving the composite image 1411 from the image processing apparatus 1103, the determination unit 1302 determines whether the similarity to the composite image 1410 received from the image processing apparatus 1103 immediately before the composite image 1411 is a predetermined value or more. Since the composite image 1410 and the composite image 1411 are different composite images, the similarity is less than the predetermined value. In this case, the image correction unit 1301 displays the composite image 1411 as the display image on the display unit 1206 in the display period T2.

Next, the determination unit 1302 receives the composite image 1411 from the image processing apparatus 1103. At this time, the determination unit 1302 determines whether the similarity to the composite image 1411 received from the image processing apparatus 1103 immediately before the composite image 1411 is the predetermined value or more. Since the composite image 1411 and the composite image 1411 are the same image, the similarity is the predetermined value or more. In this case, the determination unit 1302 increments a count value C by one. At this point of time, the count value C=1. The calculation unit 1303 acquires C recent angular velocities in the held angular velocity group and obtains the integrated value of the C angular velocities. When C=1, the recent angular velocity=integrated value. The calculation unit 1303 then obtains the shift amount of each pixel of the composite image 1411 based on the integrated value. A method of obtaining a shift amount from an integrated value will be described with reference to FIG. 8.

Figure 8:
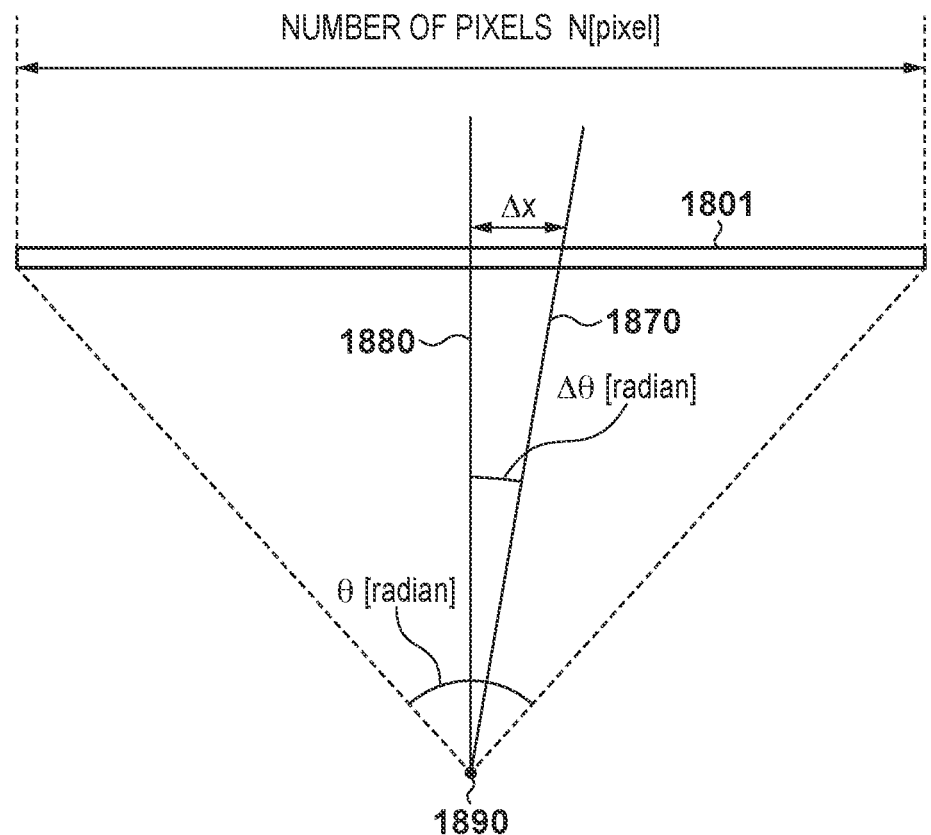
FIG. 8 is a view for explaining a method of obtaining a shift amount from an integrated value.

FIG. 8 shows a mechanism configured to obtain the shift amount of each pixel of a composite image in a case in which the user shakes his/her head in the lateral direction (horizontal direction) (in a case in which the direction of the HMD 1101 in the horizontal direction changes). Let N [pixel] be the number of pixels of a display screen 1801 of the display unit 1206 in the horizontal direction, and θ [radian] be the angle of view in the horizontal direction when the HMD user observes the display screen 1801. The integrated value is represented by Δθ [radian]. Δθ is the integrated value of angular velocities at azimuthal angles. As for the angular velocities at the azimuthal angles, an angular velocity in one azimuthal angle direction is defined as a positive value, and an angular velocity in the other azimuthal angle direction is defined as a negative value. In this embodiment, as shown in FIG. 8, a straight line 1880 (a straight line orthogonal to the display screen 1801) passing through a position 1890 of the HMD user and the center position of the display screen 1801 is defined as a reference line. A distance Δx in the horizontal direction between the center position of the display screen 1801 and a position at which a straight line 1870 that makes the angle Δθ with the reference line crosses the display screen 1801 is obtained as the shift amount of each pixel of a composite image in the horizontal direction. At this time, Δx can be obtained by calculating $$\Delta x = (N/2) \times (\tan \Delta\theta / \tan(\theta/2)) \quad (1)$$

Note that FIG. 8 shows the method of obtaining the shift amount in a case in which the user shakes his/her head in the lateral direction (horizontal direction) (in a case in which the direction of the HMD 1101 in the horizontal direction changes). However, even in a case in which the user shakes his/her head in the longitudinal direction (vertical direction) (in a case in which the direction of the HMD 1101 in the vertical direction changes), the shift amount in the vertical direction can be obtained by the same method. Additionally, if the user shakes his/her head in an oblique direction, the oblique direction is decomposed into a lateral direction and a longitudinal direction, and the shift amount is obtained by the above-described method for each of the decomposed directions.

Figure 5D:
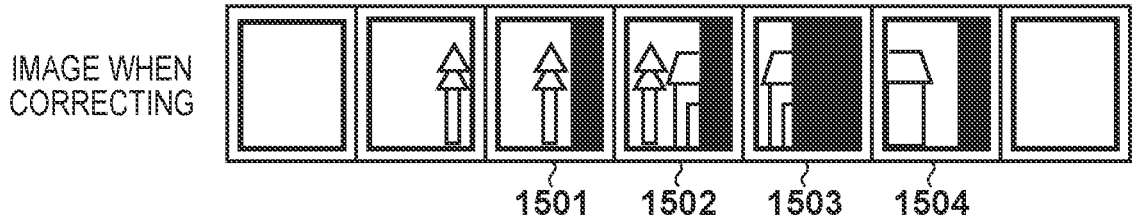

The image correction unit 1301 generates a shifted composite image 1501 in which each pixel of the composite image 1411 is shifted by the shift amount obtained in the above-described way (performs shift processing), and displays the shifted composite image 1501 as the display image on the display unit 1206. In the case of FIG. 5D, since the count value C=1, the shift amount is obtained by setting one recent angular velocity as Δθ.

Next, the determination unit 1302 receives the composite image 1412 from the image processing apparatus 1103. At this time, the determination unit 1302 determines whether the similarity to the composite image 1411 received from the image processing apparatus 1103 immediately before the composite image 1412 is the predetermined value or more. Since the composite image 1411 and the composite image 1412 are different composite images, the similarity is less than the predetermined value. In this case, the determination unit 1302 determines whether the continuation count of continuously determining that "the similarity is the predetermined value or more" up to the composite image 1411 that is the composite image one frame before the composite image 1412 is 0. In the case of FIG. 5C, since the composite image 1411 is received continuously twice, the continuation count=1. In this case, the determination unit 1302 sets the continuation count=1 to the count value C. The method of obtaining the shift amount based on the count value C is the same as described above. Here, since the count value C=1, the shift amount is obtained by setting one recent angular velocity as Δθ.

The image correction unit 1301 generates a shifted composite image 1502 in which each pixel of the composite image 1412 is shifted by the obtained shift amount, and displays the generated shifted composite image 1502 as the display image on the display unit 1206. That is, as shown in FIG. 5D, the shifted composite image 1502 is an image in which each pixel of the composite image 1412 is shifted leftward by the moving amount of the head corresponding to one frame. Note that a region in which no image exists due to the shift of the pixels is displayed as a black image. However, the present invention is not limited to this. For example, if a composite image having a region size larger than the display image is received from the image processing apparatus 1103, the position of the cutout region of the display image in the composite image is moved by the shift amount, thereby reducing the occurrence of the black image.

Next, the determination unit 1302 receives the composite image 1412 from the image processing apparatus 1103. At this time, the determination unit 1302 determines whether the similarity to the composite image 1412 received from the image processing apparatus 1103 immediately before the composite image 1412 is the predetermined value or more. Since the composite image 1412 and the composite image 1412 are the same composite image, the similarity is the predetermined value or more. In this case, the determination unit 1302 increments the count value C by one. At this point of time, the count value C=2. The method of obtaining the shift amount based on the count value C is the same as described above. Here, since the count value C=2, the shift amount is obtained by setting the integrated value of two recent angular velocities as Δθ. The image correction unit 1301 generates a shifted composite image 1503 in which each pixel of the composite image 1412 is shifted by the obtained shift amount, and displays the generated shifted composite image 1503 as the display image on the display unit 1206.

Next, the determination unit 1302 receives the composite image 1414 from the image processing apparatus 1103. At this time, the determination unit 1302 determines whether the similarity to the composite image 1412 received from the image processing apparatus 1103 immediately before the composite image 1414 is the predetermined value or more. Since the composite image 1412 and the composite image 1414 are different composite images, the similarity is less than the predetermined value. In this case, the determination unit 1302 determines whether the continuation count of continuously determining that "the similarity is the predetermined value or more" up to the composite image 1412 that is the composite image one frame before the composite image 1414 is 0. In the case of FIG. 5C, since the composite image 1412 is received continuously twice, the continuation count=1. In this case, the determination unit 1302 sets the continuation count=1 to the count value C. The method of obtaining the shift amount based on the count value C is the same as described above. Here, the shift amount is obtained by setting one recent angular velocity as Δθ. The image correction unit 1301 generates a shifted composite image 1504 in which each pixel of the composite image 1414 is shifted by the obtained shift amount, and displays the generated shifted composite image 1504 as the display image on the display unit 1206.

Figure 5E:
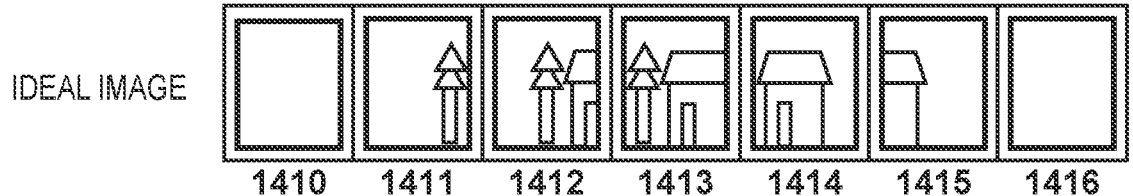

FIG. 5E shows the same as in FIG. 4B. When FIG. 5D and FIG. 5E are compared, the positions of the objects in the shifted composite images 1501 to 1504 generated according to this embodiment are the same as the positions of the objects in the composite images 1412 to 1415. Hence, even when the shifted composite images generated according to this embodiment are presented as the display images to the HMD user, the HMD user hardly feels uncomfortable.

Figure 6A:
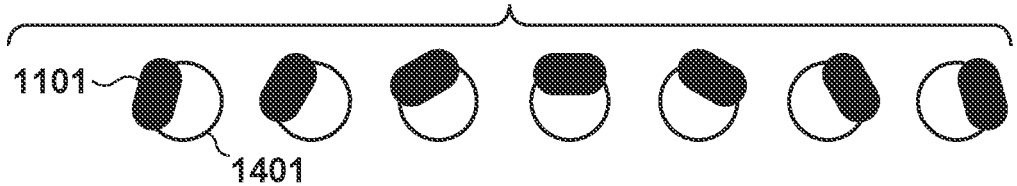
FIGS. 6A to 6E are views for explaining a case different from that shown in FIGS. 5A to 5E.

A case in which the situation of the delay in the generation of a composite image is different from that shown in FIGS. 5A to 5E will be described with reference to FIGS. 6A to 6E. FIGS. 6A and 6C are the same as FIGS. 5A and 5C, and a description thereof will be omitted.

Figure 6B:
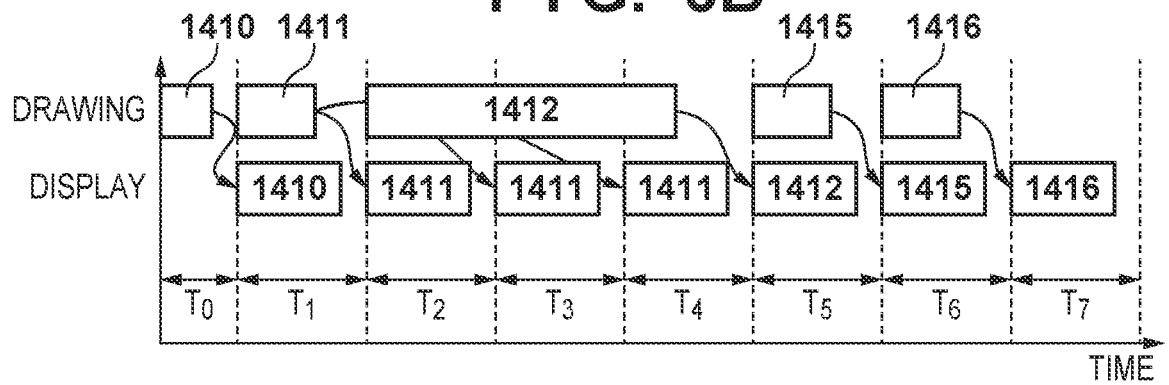
Figure 6C:
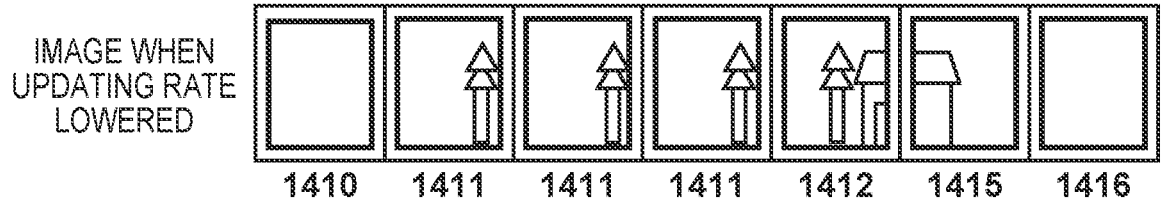
Figure 6D:
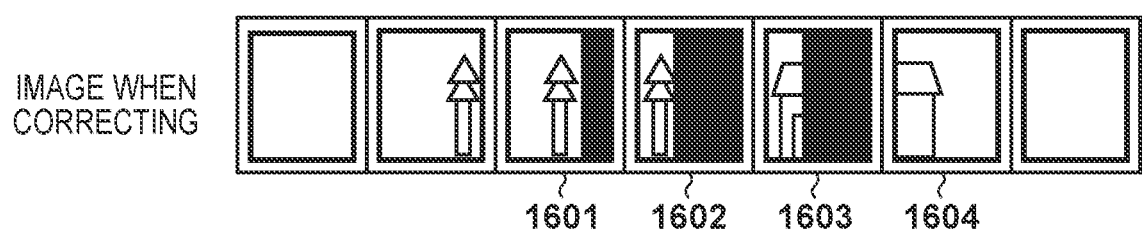
Figure 6E:
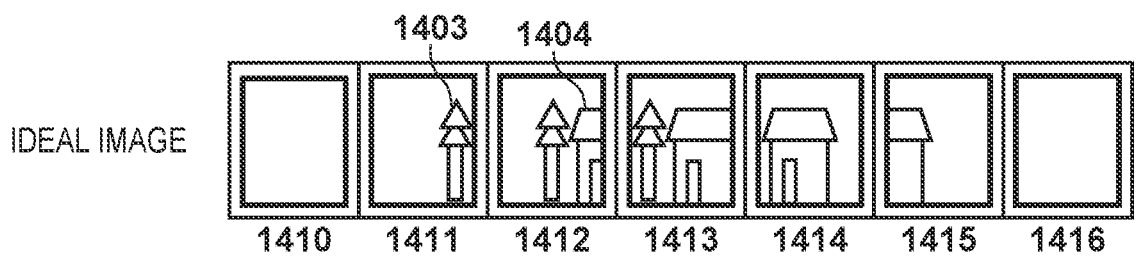

As shown in FIG. 6B, the generation of the composite image 1412 is completed halfway through the display period T4. Since the composite image 1411 received from the image processing apparatus 1103 is different from the composite image 1410 received immediately before, the composite image 1411 is displayed as the display image on the display unit 1206 in the display period T2.

The composite image 1411 received next is the same as the composite image 1411 received immediately before. For this reason, as in the case of FIG. 5D, a shifted composite image 1601 in which each pixel of the composite image 1411 is shifted using the shift amount obtained by setting one recent angular velocity as Δθ is generated. The generated shifted composite image 1601 is displayed on the display unit 1206.

The composite image 1411 received next is the same as the composite image 1411 received immediately before. For this reason, the count value C is incremented by one to obtain C=2, and the shift amount is obtained by setting the integrated value of two recent angular velocities as Δθ. A shifted composite image 1602 in which each pixel of the composite image 1411 is shifted using the obtained shift amount is generated. The generated shifted composite image 1602 is displayed on the display unit 1206.

The composite image 1412 received next is different from the composite image 1411 received immediately before. Since the continuation count of continuously determining that "the similarity is the predetermined value or more" up to the composite image 1411 is 2, C=2. The shift amount is obtained by setting the integrated value of two recent angular velocities as Δθ, and a shifted composite image 1603 in which each pixel of the composite image 1412 is shifted using the obtained shift amount is generated. The generated shifted composite image 1603 is displayed on the display unit 1206.

The composite image 1415 received next is different from the composite image 1412 received immediately before. Since the continuation count of continuously determining that "the similarity is the predetermined value or more" up to the composite image 1412 one frame before the composite image 1415 is 0, C=0. Hence, a composite image 1604 that is the same as the composite image 1415 is displayed on the display unit 1206.

Figure 9:
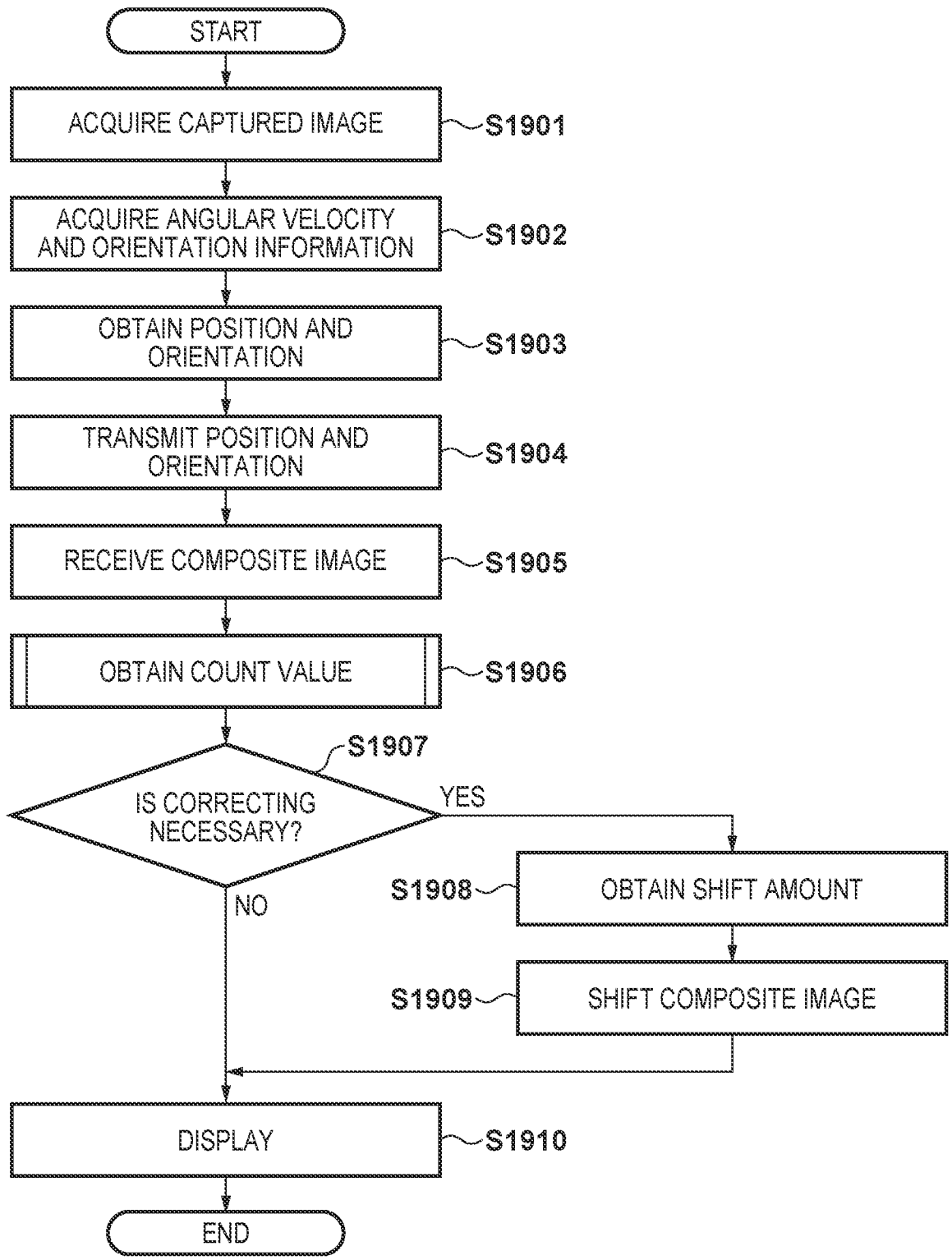
FIG. 9 is a flowchart of processing performed by the HMD 1101.

Processing performed by the HMD 1101 to display the composite image of one frame on the display unit 1206 will be described next with reference to FIG. 9 that shows the flowchart of the processing. Note that when the processing according to the flowchart of FIG. 9 is repetitively performed, composite images of a plurality of frames can be displayed on the display unit 1206.

In step S1901, the image capturing unit 1202 acquires a captured image by capturing the physical space, sends the acquired captured image to the calculation unit 1208, and transmits the captured image to the image processing apparatus 1103 via the communication unit 1204.

In step S1902, the orientation sensor unit 1203 measures the orientation information and the angular velocity, sends the angular velocity to the calculation unit 1303, and sends the orientation information to the calculation unit 1208.

In step S1903, the calculation unit 1208 acquires the captured image obtained by the image capturing unit 1202 and the orientation information obtained by the orientation sensor unit 1203. The calculation unit 1208 calculates, from the acquired captured image, the position of the image capturing unit 1202 at the time of capturing of the image. In addition, the calculation unit 1208 converts the orientation of the orientation sensor unit 1203 represented by the acquired orientation information using the relative orientation relationship between the image capturing unit 1202 and the orientation sensor unit 1203, thereby obtaining the orientation of the image capturing unit 1202.

In step S1904, the calculation unit 1208 transmits the position and orientation of the image capturing unit 1202 obtained in step S1903 to the image processing apparatus 1103 via the communication unit 1204.

Figure 10:
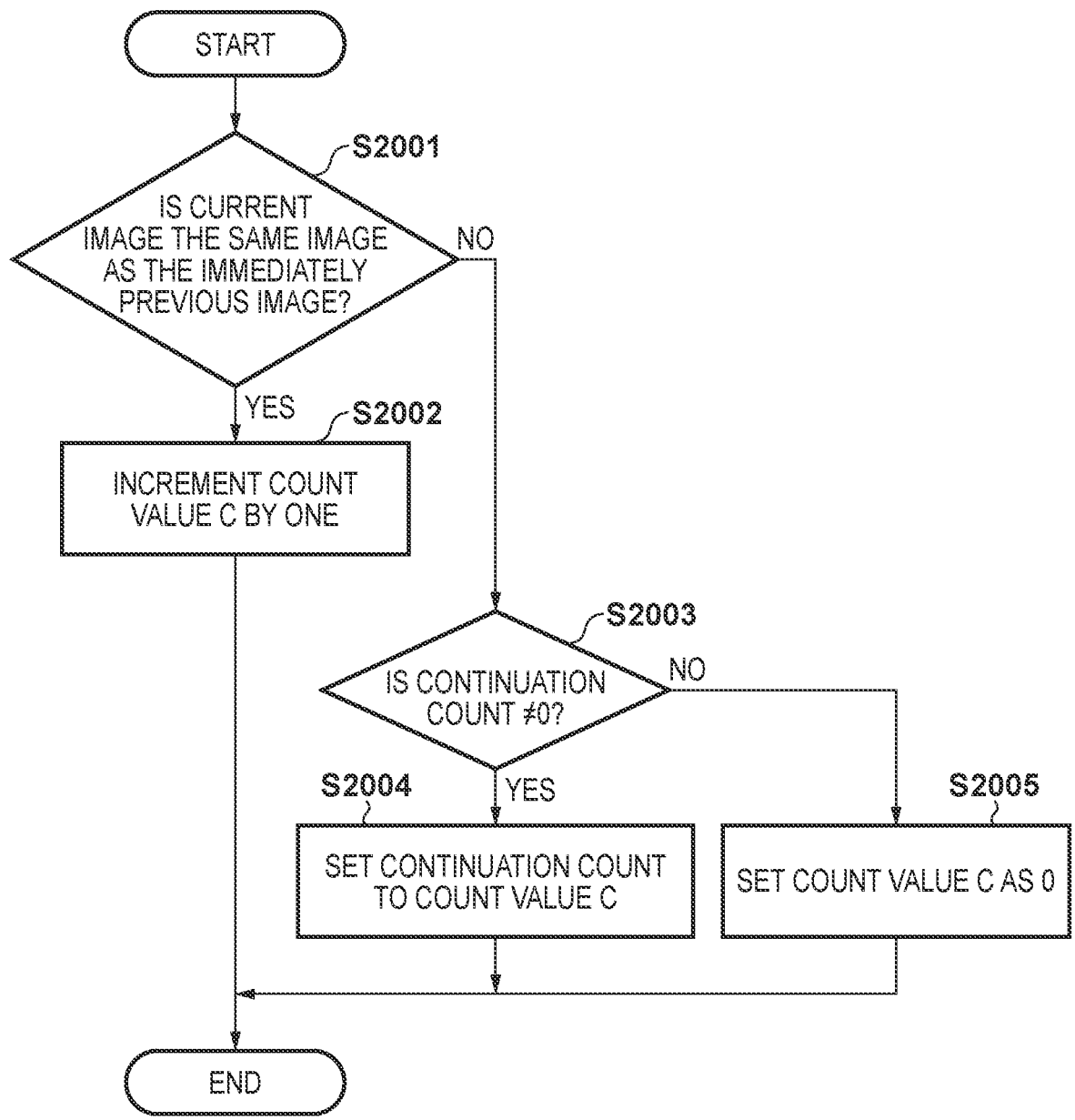
FIG. 10 is a flowchart showing details of processing in step S1906.

In step S1905, the image processing unit 1205 (determination unit 1302) receives a composite image transmitted from the image processing apparatus 1103 via the communication unit 1204. In step S1906, the image processing unit 1205 (determination unit 1302) obtains the count value in the above-described way. Details of the processing in step S1906 will be described with reference to the flowchart of FIG. 10.

In step S2001, the determination unit 1302 determines whether the similarity between the composite image received from the image processing apparatus 1103 in step S1905 and the composite image received from the image processing apparatus 1103 immediately before the composite image is a predetermined value or more. If the similarity is the predetermined value or more, it is determined that the composite images are the same, and the process advances to step S2002. On the other hand, if the similarity is less than the predetermined value, it is determined that the composite images are different from each other, and the process advances to step S2003.

In step S2002, the determination unit 1302 increments the count value C by one. On the other hand, in step S2003, the determination unit 1302 determines whether the continuation count of continuously determining that "the similarity is the predetermined value or more" up to the composite image one frame before the composite image received in step S1905 is 0. As the result of the determination, if the continuation count is not 0, the process advances to step S2004. If the continuation count is 0, the process advances to step S2005. In step S2004, the determination unit 1302 sets the continuation count to the count value C. On the other hand, in step S2005, the determination unit 1302 sets 0 to the count value C.

Referring back to FIG. 9, next, in step S1907, the image correction unit 1301 determines whether the correction (shift) of the composite image is necessary (whether the count value C is 0). If the correction of the composite image is necessary (count value C≠0), the process advances to step S1908. If the correction of the composite image is not necessary (count value C=0), the process advances to step S1910.

In step S1908, the calculation unit 1303 performs calculation processing based on the count value C in the above-described way, thereby obtaining a shift amount. In step S1909, the image correction unit 1301 generates a shifted composite image (corrected frame image) in which the composite image received in step S1905 is shifted based on the shift amount obtained in step S1908.

When the process advances from step S1907 to step S1910, in step S1910, the image correction unit 1301 causes the display unit 1206 to display the composite image received in step S1905 as the display image. On the other hand, when the process advances from step S1909 to step S1910, in step S1910, the image correction unit 1301 causes the display unit 1206 to display the shifted composite image generated in step S1909 as the display image.

As described above, according to this embodiment, even in a case in which the load of generation processing of the composite image becomes high, and the updating rate of the display of the composite image thus lowers, it is possible to reduce the uncomfort of the HMD user for the composite image and reduce the motion sickness of the HMD user who views the composite image.

Modification 1

In the first embodiment, the image processing apparatus 1103 and the HMD 1101 are separate apparatuses. However, the apparatuses may be integrated. That is, the HMD 1101 may have some or all of the functions described above as the functions of the image processing apparatus 1103.

Modification 2

In the first embodiment, the integrated value of angular velocities is used as the integrated value. However, the integrated value is not limited to the integrated value of angular velocities, and for example, the integrated value of quaternions may be used.

Modification 3

In the first embodiment, the captured image and the position and orientation of the HMD 1101 are transmitted from the HMD 1101 to the image processing apparatus 1103, and the image processing apparatus 1103 generates a composite image using the captured image and the position and orientation and transmits the generated composite image to the HMD 1101. However, the share form of the processing for generating the composite image is not limited to this.

For example, the HMD 1101 transmits the position and orientation of the HMD 1101 to the image processing apparatus 1103, and the image processing apparatus 1103 generates a virtual space image based on the position and orientation and transmits the generated virtual space image to the HMD 1101. The HMD 1101 generates a composite image in which the virtual space image received from the image processing apparatus 1103 is composited with the captured image captured by the image capturing unit 1202.

Alternatively, for example, the captured image is transmitted from the HMD 1101 to the image processing apparatus 1103, and the image processing apparatus 1103 obtains the position and orientation of the HMD 1101 based on the captured image, generates a virtual space image based on the position and orientation, and transmits the virtual space image to the HMD 1101. The HMD 1101 generates a composite image in which the virtual space image received from the image processing apparatus 1103 is composited with the captured image captured by the image capturing unit 1202.

As described above, when generating the composite image on the side of the HMD 1101, "the composite image received this time" in the above description, needs to be replaced with "the composite image generated this time", and "the previously received composite image" needs to be replaced with "the previously generated composite image", that is, the composite image one frame before.

Modification 4

In the first embodiment, the measurement by the orientation sensor unit 1203 is synchronized with the image capturing timing of the image capturing unit 1202. However, the present invention is not limited to this, and for example, the measurement may be synchronized with the timing at which the image processing unit 1205 receives an image from the image processing apparatus 1103. In addition, the measurement by the orientation sensor unit 1203 may be performed at a frequency higher than the frequency at which the image processing unit 1205 receives an image from the image processing apparatus 1103.

Modification 5

In the first embodiment, the HMD 1101 has been described as a video see-through type HMD. However, the HMD 1101 may be an optical see-through type HMD. In this case, the HMD 1101 acquires the position and orientation of a viewpoint (near the eyes of the HMD user) by a position and orientation sensor or the like, and transmits the position and orientation to the image processing apparatus 1103. The image processing apparatus 1103 generates a virtual space image from the position and orientation by the same method as described above, and transmits the generated virtual space image to the HMD 1101. The HMD 1101 executes the processing according to the flowchart of FIG. 9 described above not for the composite image but for the virtual space image.

Second Embodiment

In this embodiment, not only shifting of a composite image according to an angular velocity but also enlargement/reduction of a composite image according to a change of the position of an HMD 1101 is performed. In the following embodiments and modifications including this embodiment, differences from the first embodiment will be described, and the remaining is assumed to be the same as in the first embodiment unless it is specifically stated otherwise.

Figure 11:
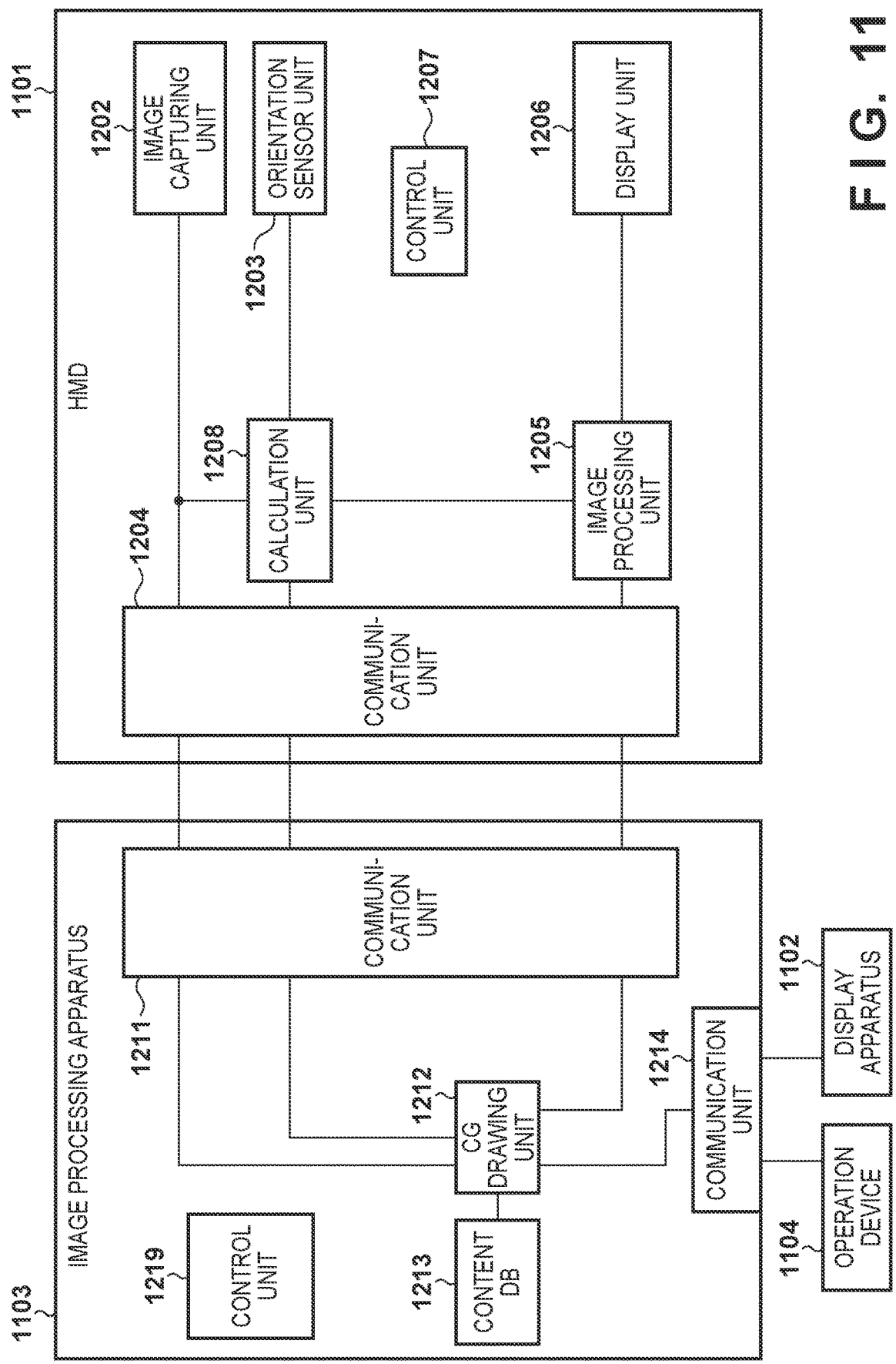
FIG. 11 is a block diagram showing an example of the functional arrangement of each of an HMD 1101 and an image processing apparatus 1103.

An example of the functional arrangement of each of the HMD 1101 and an image processing apparatus 1103 according to this embodiment will be described first with reference to the block diagram of FIG. 11. In the first embodiment, the output from the orientation sensor unit 1203 is input to the image processing unit 1205, as shown in FIG. 2. In this embodiment, however, the output from a calculation unit 1208 is input to an image processing unit 1205, as shown in FIG. 11. An example of the functional arrangement of the image processing unit 1205 will be described next with reference to the block diagram of FIG. 12.

A calculation unit 1303 obtains a shift amount, as in the first embodiment, and also obtains the enlargement/reduction ratio of a composite image based on a change of a position acquired from the calculation unit 1208. The operation of the calculation unit 1303 according to this embodiment will be described using a detailed example shown in FIGS. 13A to 13C.

Figure 13A:
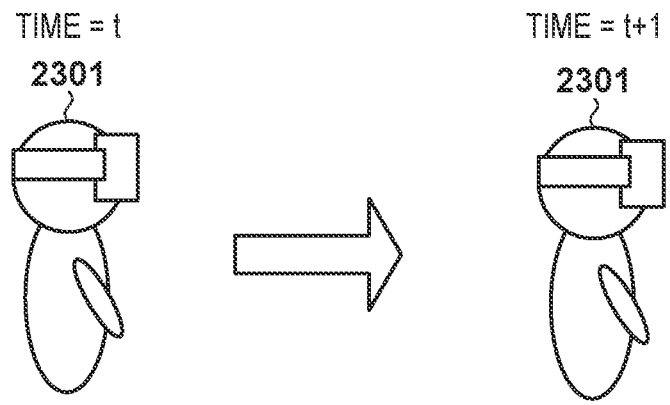
FIGS. 13A to 13C are views showing an example of the operation of a calculation unit 1303.

FIG. 13A shows a state in which an HMD user 2301 moves forward. The HMD user 2301 (the HMD user 2301 before the movement) at time t is shown on the left side of FIG. 13A, and the HMD user 2301 (the HMD user 2301 after the movement) at time (t+1) is shown on the right side of FIG. 13A.

Figure 13B:
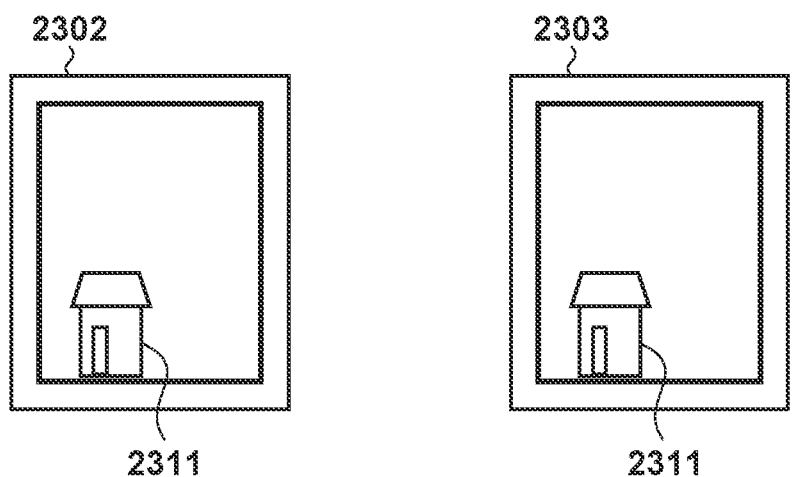

A composite image 2302 provided to the HMD user 2301 as a composite image corresponding to the time t is shown on the left side of FIG. 13B, and a composite image 2303 provided to the HMD user 2301 as a composite image corresponding to the time (t+1) is shown on the right side of FIG. 13B. In FIG. 13B, the composite image 2302 and the composite image 2303 are the same composite image. That is, this means that a composite image that should be displayed as a frame next to the composite images 2302 and 2303 is not yet obtained from the image processing apparatus 1103.

Here, both the composite images 2302 and 2303 include objects (virtual objects or physical objects) 2311 displayed in the same size. However, since the HMD user 2301 at the time (t+1) has moved forward as compared to the HMD user 2301 at the time t, the object 2311 in the composite image 2303 should be displayed larger than the object 2311 in the composite image 2302. Considering this point, not only shifting of the composite image according to a change of the orientation of the HMD 1101 but also enlargement/reduction of the composite image according to a change of the position of the HMD 1101 is performed.

Figure 13C:
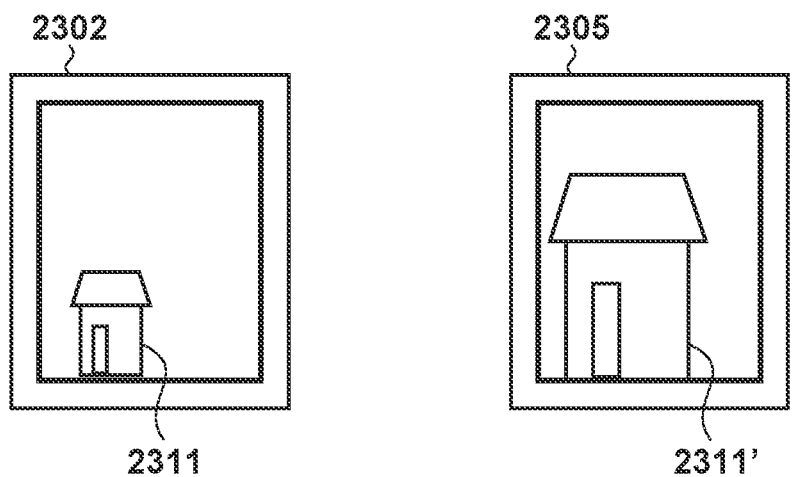

That is, as shown in FIG. 13C, to the HMD user 2301 at the time (t+1), a composite image 2305 in which the object 2311 in the composite image 2303 is enlarged by enlarging the composite image 2303 is presented. The composite image 2305 is an image obtained by enlarging the composite image 2303 and then cutting out a region of the same size as the composite image 2303. An object 2311' in the composite image 2305 is an object obtained by enlarging the object 2311 in the composite image 2303. Note that pixel interpolation is performed after the image is enlarged. This technique is known, and a description thereof will be omitted.

Figure 14:
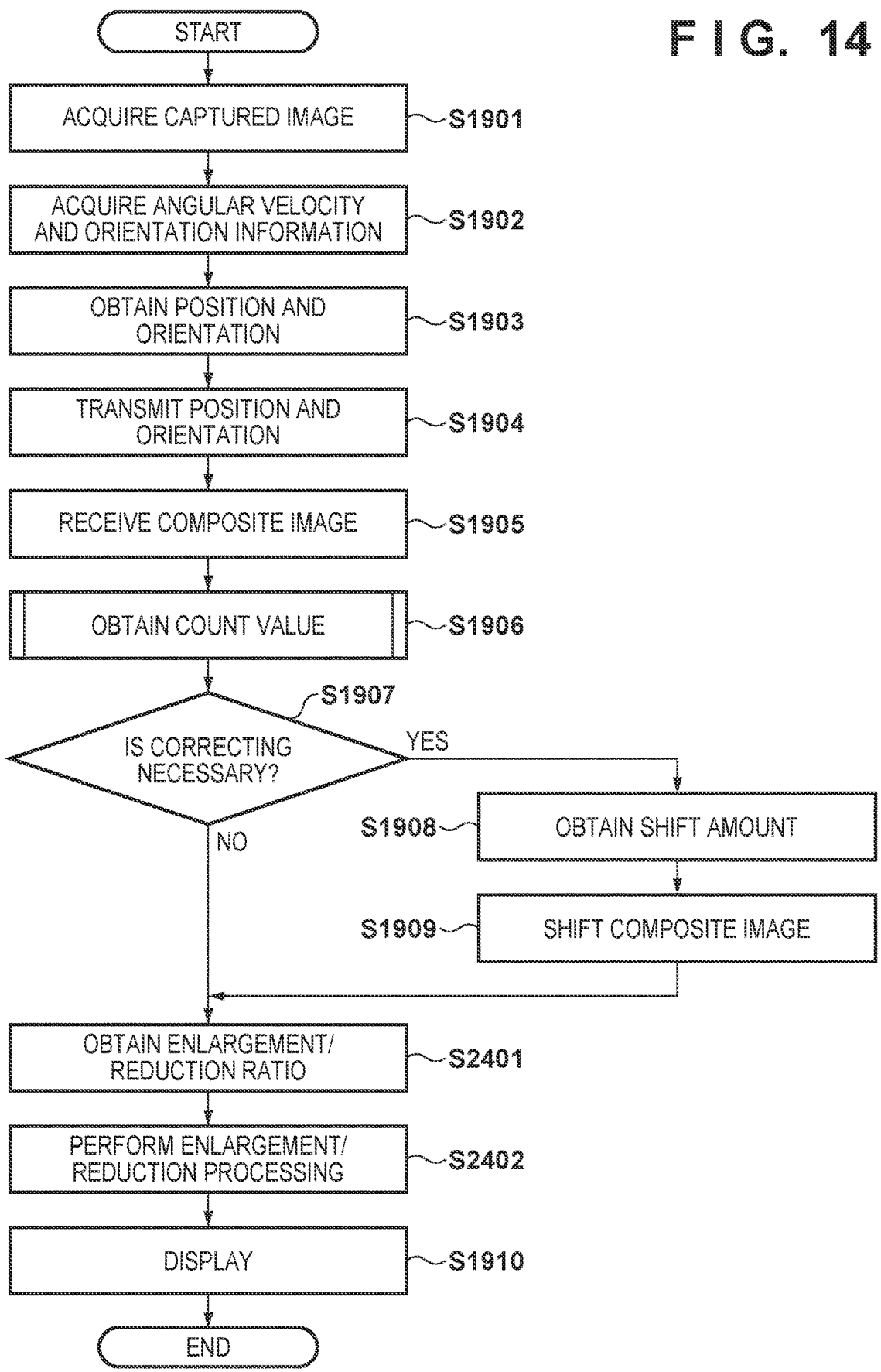
FIG. 14 is a flowchart of processing performed by the HMD 1101.

Processing performed by the HMD 1101 to display the composite image of one frame on a display unit 1206 will be described next with reference to FIG. 14 that shows the flowchart of the processing. Note that when the processing according to the flowchart of FIG. 14 is repetitively performed, composite images of a plurality of frames can be displayed on the display unit 1206. In addition, the same step numbers as in FIG. 9 denote the same processing steps in FIG. 14, and a description thereof will be omitted.

Upon determining in step S1907 that the correction of the composite image is necessary (count value $C \neq 0$), the process advances to step S1908. Upon determining that the correction of the composite image is not necessary (count value $C=0$), the process advances to step S2401.

In step S2401, the calculation unit 1303 obtains the difference between the position calculated by the calculation unit 1208 this time and the previously calculated position as a moving distance DA of the HMD 1101. At this time, in a case in which the moving direction component of the HMD 1101 includes a moving component in the frontward direction, the sign of the moving distance is positive. In a case in which the moving direction component includes a moving component in a direction opposite by 180° to the frontward direction, the sign of the moving distance is negative.

The calculation unit 1303 also obtains the distance to an object near the center of the composite image. There are various methods of obtaining a distance DB to the object near the center of the composite image. For example, if a physical object is captured near the center of the composite image, for example, a distance up to the physical object measured by a distance sensor attached to the HMD 1101 may be acquired as the distance DB. Alternatively, the distance DB may be obtained from a captured image corresponding to the composite image. If a virtual object is captured near the center of the composite image, the distance between the position of a viewpoint used to generate the virtual space image and the position of the virtual object may be acquired as the distance DB from the image processing apparatus 1103. The calculation unit 1303 then obtains the value of DB/(DB−DA) as the enlargement/reduction ratio of the composite image. Note that the method of obtaining the enlargement/reduction ratio of the composite image is not limited to a specific method, and for example, the enlargement/reduction ratio=k×DA+1 (k is a normalization constant) may be used. At this time, when DA≤−1/k, a predetermined small value (for example, 0.0001) may be given as the enlargement/reduction ratio. When DA≥(L−1)/k (L is a predetermined large value), a predetermined large value (for example, 100) may be given as the enlargement/reduction ratio.

When the process advances from step S1907 to step S2401, in step S2402, the image correction unit 1301 performs enlargement/reduction according to the enlargement/reduction ratio obtained in step S2401 for the composite image received in step S1905. On the other hand, when the process advances from step S1909 to step S2401, the image correction unit 1301 performs enlargement/reduction according to the enlargement/reduction ratio obtained in step S2401 for the shifted composite image. Note that if the enlargement/reduction ratio=1, the enlargement/reduction processing may be omitted.

In step S1910, the image correction unit 1301 causes the display unit 1206 to display the composite image (an enlarged/reduced image or an image that is not enlarged/reduced) obtained via step S2402.

Note that in the flowchart of FIG. 14, the enlargement/reduction processing is performed after shift processing is performed for the composite image. However, the order may be reversed to perform the shift processing after the enlargement/reduction processing is performed.

As described above, according to this embodiment, the composite image can be corrected for many user operations as compared to the first embodiment. This can reduce the motion sickness of the HMD user who views the composite image. Note that for the calculation of the shift amount, an angular velocity may be used, or an orientation calculated by the calculation unit 1208 may be used.

Third Embodiment

In this embodiment, an HMD 1101 decides, based on the drawing rate of a composite image in an image processing apparatus 1103, which one of composite images received from the image processing apparatus 1103 should be shifted and how much the composite image should be shifted. Here, the drawing rate of a composite image represents the number of frames of a composite image generated per sec.

Figure 15:
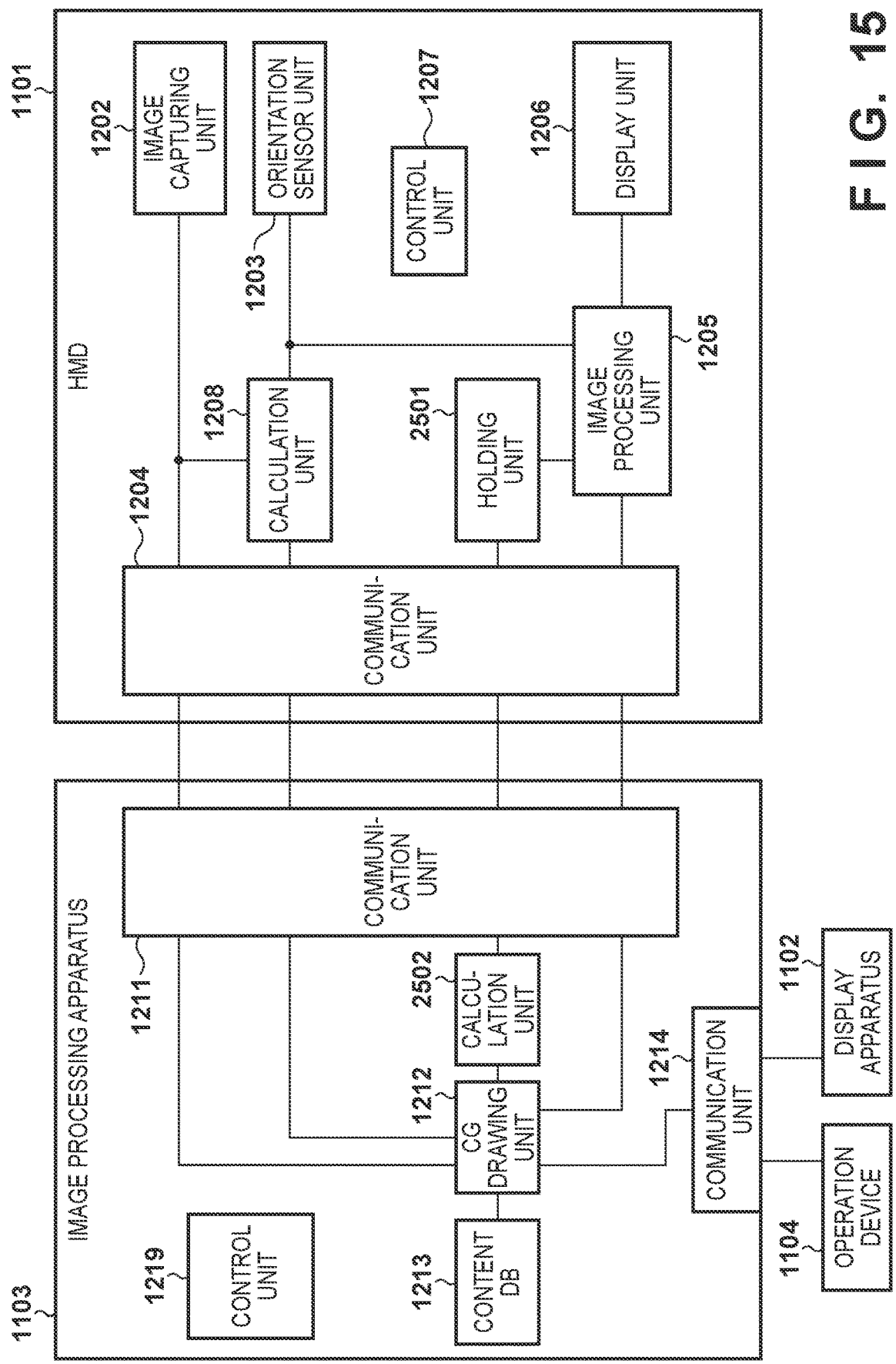
FIG. 15 is a block diagram showing an example of the functional arrangement of each of an image processing apparatus 1103 and an HMD 1101.

An example of the functional arrangement of each of the image processing apparatus 1103 and the HMD 1101 according to this embodiment will be described with reference to the block diagram of FIG. 15. In this embodiment, a description will be made assuming that the frame rate in a display unit 1206 of the HMD 1101 is 60 Hz (the frame rate is a rate to update the display screen of the display unit 1206 60 times per sec and is 60 frames/sec). However, the frame rate of the display unit 1206 is not limited to 60 Hz. Information representing "60 Hz" that is the frame rate of the display unit 1206 is stored as frame rate information in a holding unit 2501 of the HMD 1101. The frame rate information is transmitted to the image processing apparatus 1103 via a communication unit 1204.

A calculation unit 2502 receives, via a communication unit 1211, the frame rate information transmitted from the HMD 1101. Based on the received frame rate information and an estimated drawing rate for a composite image to be generated by a CG drawing unit 1212, the calculation unit 2502 decides an actual drawing rate for the composite image to be generated by the CG drawing unit 1212.

Figures 16, 17:
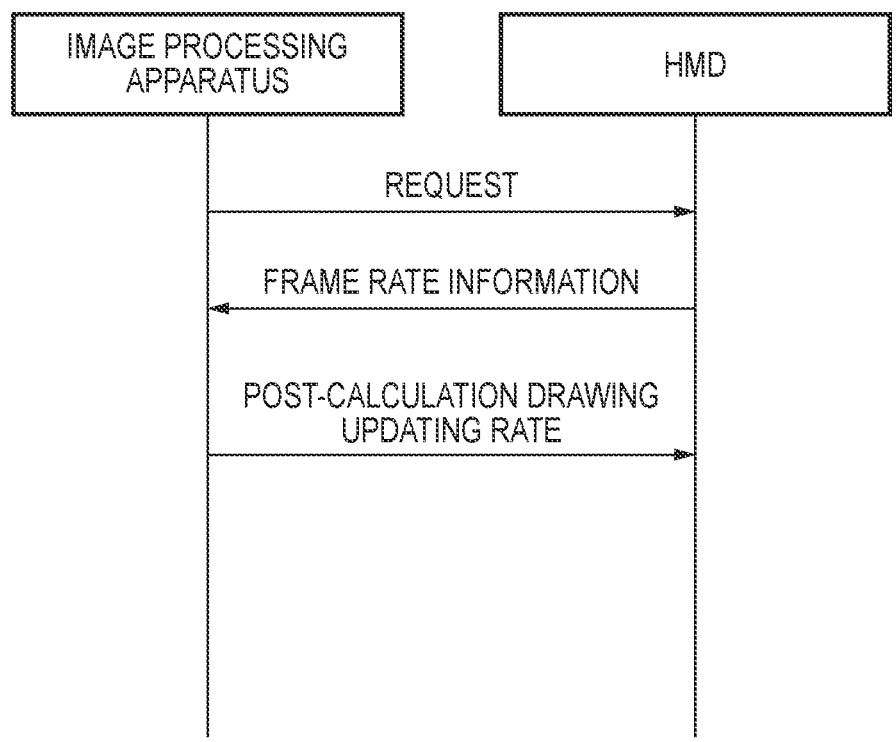
FIG. 16 is a view showing an example of the arrangement of a table corresponding to a frame rate of "60 Hz"
FIG. 17 is a sequence chart showing a communication sequence to decide a post-calculation drawing updating rate.

For example, upon receiving the frame rate information representing "60 Hz" from the HMD 1101, the calculation unit 2502 acquires a table corresponding to "60 Hz" in tables corresponding to frame rates registered in advance in the memory of a control unit 1219 of the image processing apparatus 1103. FIG. 16 shows an example of the arrangement of a table corresponding to the frame rate of "60 Hz".

An "HMD display unit updating rate" corresponds to the frame rate 60 Hz represented by the frame rate information received from the HMD 1101. A "minimum drawing updating rate" (frame) is an estimated drawing rate for the composite image to be generated by the CG drawing unit 1212. In FIG. 16, five minimum drawing updating rates "60 or more", "30 or more to 59 or less", "20 or more to 29 or less", "15 or more to 19 or less", and "10 or more to 14 or less" are registered. A "post-calculation drawing updating rate (frame)" is an actual drawing rate for each "minimum drawing updating rate" (frame).

For example, the calculation unit 2502 estimates the drawing rate at the time of maximum load based on the data amount of a scene to be drawn by the CG drawing unit 1212 and specifies the minimum drawing updating rate to which the estimated drawing rate belongs in the five minimum drawing updating rates shown in FIG. 16. The calculation unit 2502 decides the "post-calculation drawing updating rate" corresponding to the specified minimum drawing updating rate as the actual drawing rate for the composite image to be generated by the CG drawing unit 1212.

In the case of FIG. 16, if the minimum drawing updating rate is 60 or more, the post-calculation drawing updating rate is decided as 60. In a case in which the minimum drawing updating rate is "30 or more to 59 or less" the post-calculation drawing updating rate is decided as 30. As shown in FIG. 16, the post-calculation drawing updating rates are each given by 60×1/Z (Z is an integer). This is because when the updating rate of the image displayed on the display unit 1206 varies, some persons feel uncomfortable and feel motion sickness. The calculation unit 2502 transmits the thus obtained post-calculation drawing updating rate to the HMD 1101 via the communication unit 1211.

A communication sequence for deciding the post-calculation drawing updating rate between the image processing apparatus 1103 and the HMD 1101 will be described with reference to FIG. 17. When the image processing apparatus 1103 transmits a frame rate information request to the HMD 1101, the HMD 1101 transmits frame rate information to the image processing apparatus 1103 in response to the request. Note that the image processing apparatus 1103 need only acquire the frame rate information of the HMD 1101, and the arrangement for this is not limited to a specific arrangement. For example, the identification information of the HMD 1101 may be transmitted to the image processing apparatus 1103, and the image processing apparatus 1103 may specify frame rate information corresponding to the identification information received from the HMD 1101 in pieces of frame rate information managed in correspondence with identification information.

The image processing apparatus 1103 specifies the post-calculation drawing updating rate in the above-described way using the frame rate information received from the HMD 1101, and transmits the specified post-calculation drawing updating rate to the HMD 1101.

The communication sequence shown in FIG. 17 may be performed at the time of activation of the system according to this embodiment. Alternatively, the communication sequence may be performed when the user inputs an instruction using an operation device 1104 at the time of content switching or at the time of HMD user switching.

Additionally, in this embodiment, the post-calculation drawing updating rate is obtained based on the frame rate information and the estimated drawing rate for the composite image to be generated by the CG drawing unit 1212. However, the method of obtaining the post-calculation drawing updating rate is not limited to this. Considering a position and orientation calculation rate in addition to the frame rate information and the estimated drawing rate, the post-calculation drawing updating rate associated with the combination may be decided.

Figure 18A:
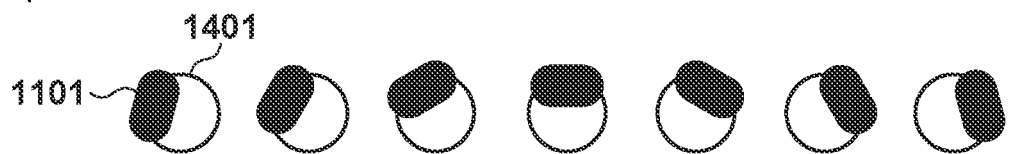
FIGS. 18A to 18D are views showing correction processing of a composite image.
Figure 18B:
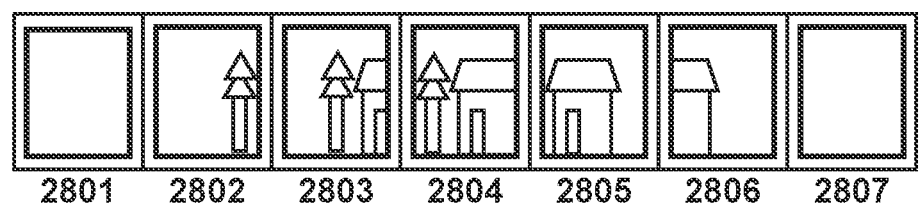

Correction processing of a composite image according to this embodiment will be described using an example shown in FIGS. 18A to 18D. FIG. 18A is the same as FIG. 4A. Composite images 2801 to 2807 shown in FIG. 18B are composite images displayed on the display unit 1206 in a case in which a frame rate represented by frame rate information equals a frame rate represented by a post-calculation drawing updating rate.

Figure 18C:
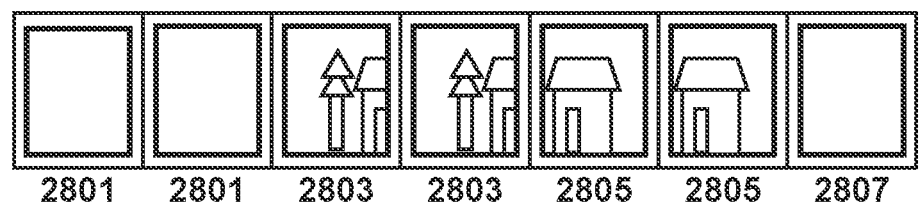

FIG. 18C shows composite images displayed on the display unit 1206 in a case in which the post-calculation drawing updating rate is ½ of the frame rate represented by the frame rate information. In this case, as shown in FIG. 18C, composite images transmitted from the image processing apparatus 1103 are composite images of every other frame in the composite images shown in FIG. 18B. An operation of displaying a received composite image twice and displaying a next received composite image twice is repeated. That is, in the case of FIG. 18C, the composite images 2801, 2803, 2805, . . . are each displayed twice.

Figure 18D:
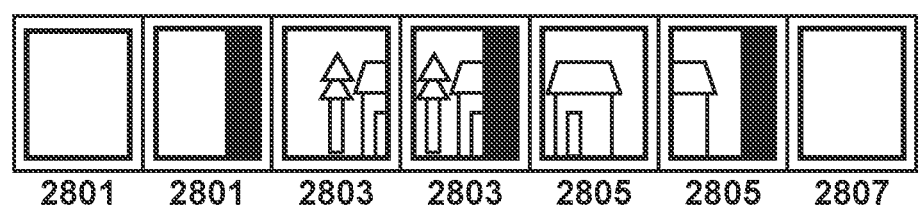

In this case, the image processing unit 1205 decides the correction target composite image or the correction amount not based on the comparison result of composite images, as in the first embodiment, but based on the post-calculation drawing updating rate notified from the image processing apparatus 1103. In the case of FIG. 18B, the frame rate is the value of (post-calculation drawing updating rate/frame rate information), that is, ½ (frame rate ratio). Hence, as shown in FIG. 18D, composite images of every other frame are decided as the correction targets, and shift processing corresponding to a count value C=1 is performed for the correction target composite images. Note that in a case of frame rate ratio=⅓, for a composite image A of every two frames, shift processing corresponding to the count value C=1 is performed, and for a composite image B of a frame next to the composite image A, shift processing corresponding to the count value C=2 is performed. For a composite image C of a frame next to the composite image B, shift processing is not performed. As described above, in a case of frame rate ratio=1/Z (Z is an integer of 3 or more), shift processing corresponding to the count value C=1 is performed for the composite image A of every (Z−1) frames. For a composite image f (f is an integer of 1 or more) frames after the composite image A, shift processing corresponding to the count value C=(f=1) is performed. For a composite image (Z−1) frames after the composite image A, shift processing is not performed.

Figure 19:
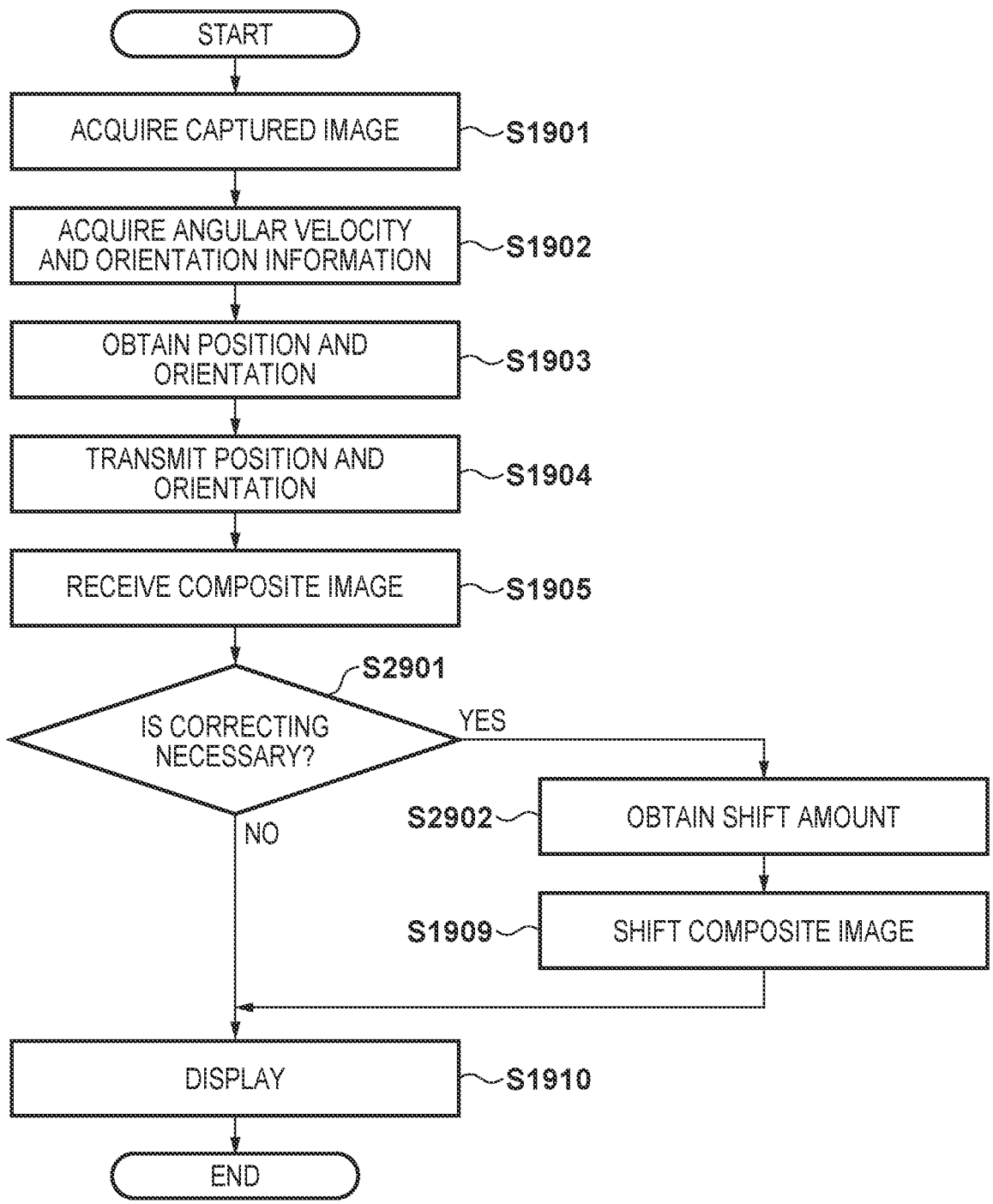
FIG. 19 is a flowchart of processing performed by the HMD 1101.

Processing performed by the HMD 1101 to display the composite image of one frame on the display unit 1206 will be described next with reference to FIG. 19 that shows the flowchart of the processing. Note that when the processing according to the flowchart of FIG. 19 is repetitively performed, composite images of a plurality of frames can be displayed on the display unit 1206. In addition, the same step numbers as in FIG. 9 denote the same processing steps in FIG. 19, and a description thereof will be omitted.

In step S2901, the image processing unit 1205 determines, based on the frame rate ratio, whether the composite image of the current frame is a shift target composite image. As the result of the determination, if the composite image of the current frame is a shift target composite image, the process advances to step S2902. If the composite image of the current frame is not a shift target composite image, the process advances to step S1910.

In step S2902, the image processing unit 1205 obtains the shift amount corresponding to the composite image of the current frame in the above-described way. In step S1909, the image processing unit 1205 generates a shifted composite image in which each pixel of the composite image of the current frame is shifted based on the shift amount obtained in step S2902.

As described above, according to this embodiment, the drawing rate is decided in advance between the image processing apparatus 1103 and the HMD 1101, thereby specifying the composite image of the correction target or deciding the correction amount without comparing the composite images.

Fourth Embodiment

Figure 20:
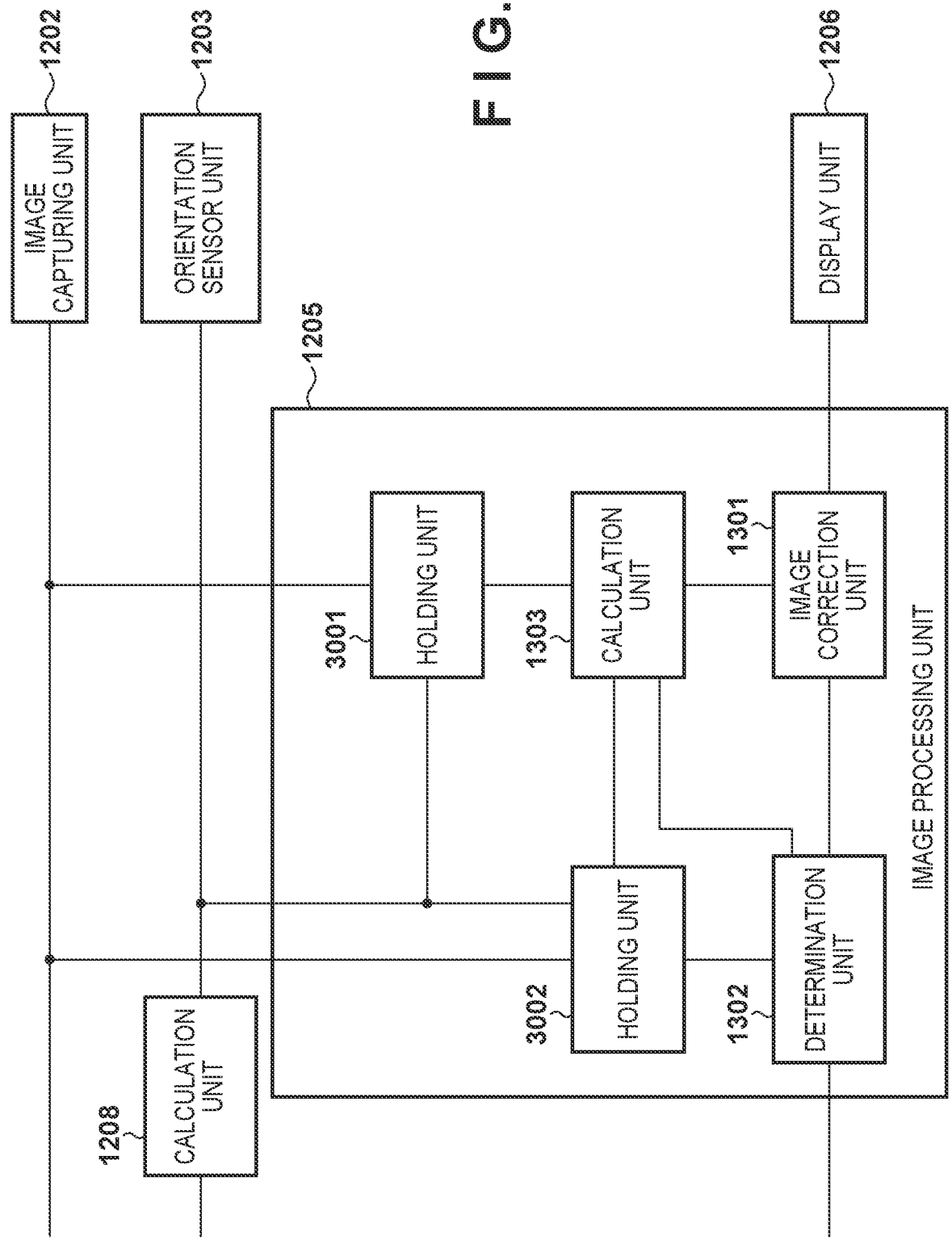
FIG. 20 is a block diagram showing an example of the functional arrangement of an image processing unit 1205.

In this embodiment, in addition to the arrangement of the first embodiment, a composite image is shifted by a shift amount based on the difference between the orientation of an HMD 1101 at the time of capturing of an image and the orientation of the HMD 1101 at the time of display of the composite image. Accordingly, a composite image that reduces the influence of the difference, that is, a composite image according to the current orientation of the head of an HMD user can be provided to the HMD user. In this embodiment, the arrangement of an image processing unit 1205 is different from that of the first embodiment. FIG. 20 is a block diagram showing an example of the functional arrangement of the image processing unit 1205 according to this embodiment.

A holding unit 3001 acquires orientation information in each image capturing by an image capturing unit 1202 from an orientation sensor unit 1203 and holds the orientation information. A holding unit 3002 acquires orientation information in each composite image reception by a determination unit 1302 from the orientation sensor unit 1203 and holds the orientation information.

As in the first embodiment, a calculation unit 1303 obtains a shift amount corresponding to a count value C. In addition, the calculation unit 1303 acquires, from the holding unit 3002, orientation information obtained when the determination unit 1302 has received a composite image, and also acquires, from the holding unit 3001, orientation information obtained when the image capturing unit 1202 has captured the image used to generate the composite image. Then, the calculation unit 1303 obtains the difference between the orientation information acquired from the holding unit 3001 and the orientation information acquired from the holding unit 3002, that is, the orientation change amount of the HMD 1101 between the time of composite image reception and the time of capturing of the image used to generate the composite image. The calculation unit 1303 obtains the shift amount of the composite image according to the obtained orientation change amount. That is, the calculation unit 1303 obtains the shift amount corresponding to the count value C and the shift amount according to the orientation change amount of the HMD 1101 between the time of image capturing and the time of composite image reception.

An image correction unit 1301 performs shift processing according to the shift amount obtained by the calculation unit 1303 for the composite image from the determination unit 1302 to generate a shifted composite image, and displays the generated shifted composite image as a display image on the display unit 1206.

Figure 21A:
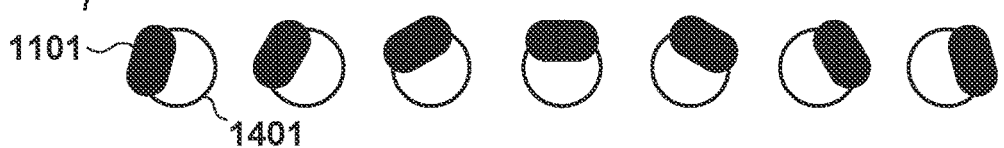
FIGS. 21A to 21F are views for explaining the operation of the image processing unit 1205.
Figure 21B:
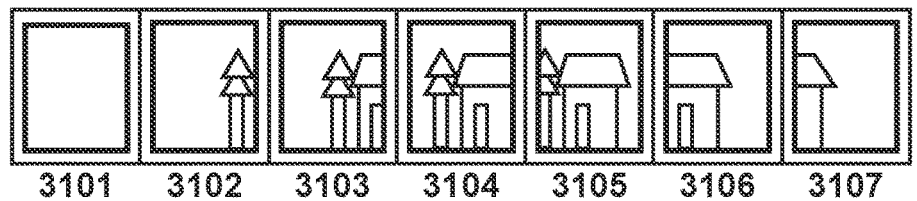

The operation of the image processing unit 1205 according to this embodiment will be described with reference to FIGS. 21A to 21F. FIG. 21A is the same as FIG. 4A. Composite images 3101 to 3107 shown in FIG. 21B are composite images corresponding to directions from the direction of the HMD 1101 shown at the left end of FIG. 21A to the direction of the HMD 1101 shown at the right end. All the composite images 3101 to 3107 shown in FIG. 21B are ideal composite images displayed in accordance with the corresponding directions of the HMD 1101 without any delay.

Figure 21C:
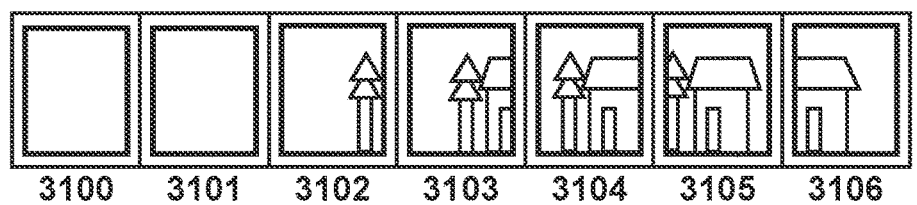

FIG. 21C shows an example of display in a case in which the composite images shown in FIG. 21B are displayed with a deviation of one frame due to the operation delay of the system (the operation delay at this time is one frame). For example, the composite image 3102 is displayed at a timing at which the composite image 3103 should be displayed.

Figure 21D:
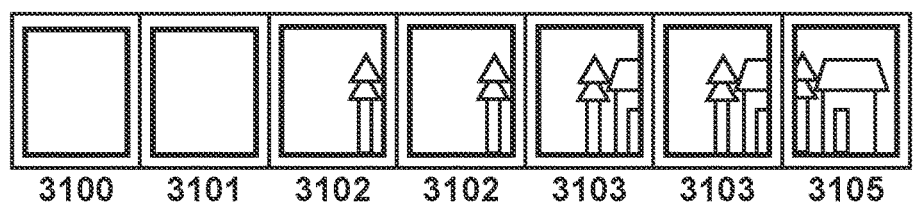

FIG. 21D shows composite images displayed on the HMD 1101 in a case in which "generation of a composite image is not completed until the display timing of the composite image" for each composite image shown in FIG. 21C. As shown in FIG. 21D, after the composite image 3102 shown in FIG. 21C is displayed continuously in two frames, the composite image 3103 whose generation is completed is displayed continuously in two frames.

Figure 21E:
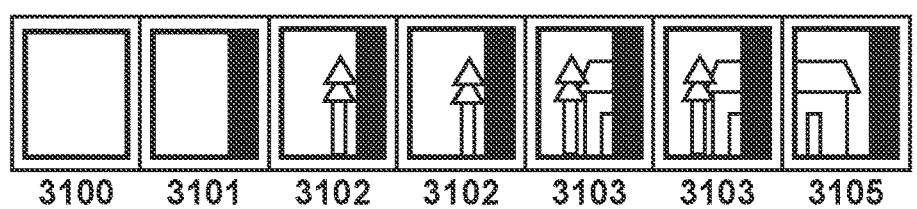

In this case, in this embodiment, the deviation of a composite image caused by the delay of the frame is corrected. In the case of FIGS. 21A to 21F, since a deviation corresponding to one frame exists from the composite image 3101, correction processing of reducing the deviation is performed for each composite image from the composite image 3101. In the case of FIGS. 21A to 21F, since the orientation change amount of the HMD 1101 is an amount in the clockwise direction, the shifted composite images 3101 to 3105 in which each pixel of the composite images 3101 to 3105 is shifted in the leftward direction are obtained, as shown in FIG. 21E. As the shift amount, $\Delta x$ obtained by calculating equation (1) while setting the orientation change amount of the HMD 1101 to $\Delta \theta$ is used.

Figure 21F:
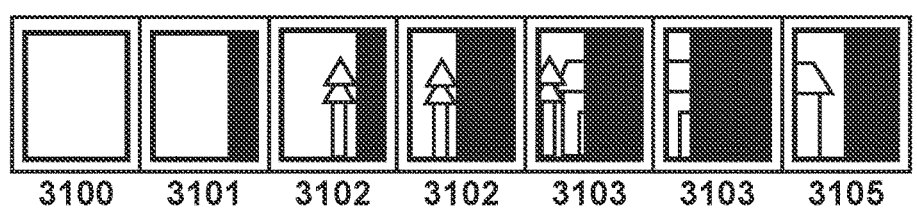

Additionally, in this embodiment, as shown in FIG. 21F, the composite images 3101 to 3105 in which the shifted composite images 3101 to 3105 shown in FIG. 21E are shifted by the shift amount corresponding to the count value C are generated, as in the first embodiment. The composite images 3101 to 3105 shown in FIG. 21F obtained by the above-described correction are the same as the composite images 3101 to 3105 shown in FIG. 21B except black images. Note that in this embodiment as well, if a composite image having a region size larger than the display image is received from the image processing apparatus 1103, the position of the cutout region of the display image in the composite image is moved by the shift amount, thereby reducing the occurrence of the black image.

Figure 22:
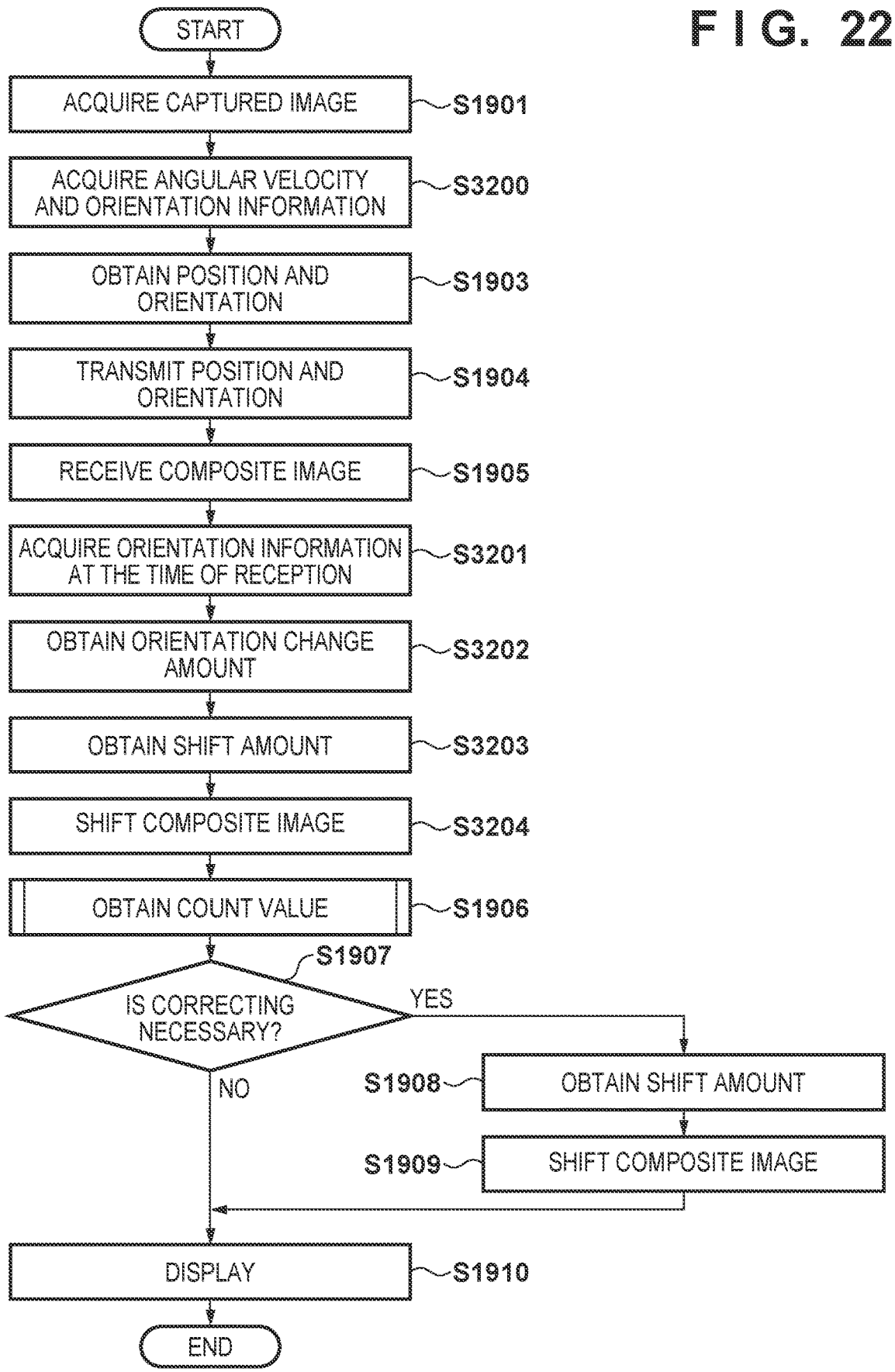
FIG. 22 is a flowchart of processing performed by an HMD 1101.

Processing performed by the HMD 1101 to display the composite image of one frame on the display unit 1206 will be described next with reference to FIG. 22 that shows the flowchart of the processing. Note that when the processing according to the flowchart of FIG. 22 is repetitively performed, composite images of a plurality of frames can be displayed on the display unit 1206. In addition, the same step numbers as in FIG. 9 denote the same processing steps in FIG. 22, and a description thereof will be omitted.

In step S3200, in addition to the processing of step S1902 described above, the holding unit 3001 acquires orientation information measured by the orientation sensor unit 1203 in the processing and holds the orientation information. In step S3201, the holding unit 3002 acquires orientation information at the time of composite image reception in step S1905 from the orientation sensor unit 1203 and holds the orientation information. In step S3202, the calculation unit 1303 obtains the orientation change amount of the HMD 1101 between the time of composite image reception and the time of capturing of the image used to generate the composite image.

In step S3203, the calculation unit 1303 obtains the shift amount of the composite image according to the orientation change amount obtained in step S3202. In step S3204, the image correction unit 1301 performs shift processing according to the shift amount obtained in step S3203 for the composite image received in step S1905, thereby generating a shifted composite image. Note that when shift processing is performed in step S1909, the composite image that has undergone the shift processing in step S3204 is the target.

Modification 1

In this embodiment, the orientation change amount is obtained using orientation information obtained by the orientation sensor unit 1203. However, the orientation change amount may be obtained using an orientation obtained by the calculation unit 1208. That is, the orientation change amount of the HMD 1101 between an orientation obtained by the calculation unit 1208 at the time of composite image reception and an orientation obtained by the calculation unit 1208 from the captured image used to generate the composite image may be obtained.

As in the third embodiment, which one of composite images received from the image processing apparatus 1103 should be shifted and how much the composite image should be shifted may be decided in accordance with the drawing rate of the composite image in the image processing apparatus 1103.

Additionally, in this embodiment, the degree of the operation delay of the system is known. However, the acquisition form of the operation delay of the system is not limited to a specific acquisition form. For example, a time T after the HMD 1101 transmits the captured image to the image processing apparatus 1103 until the HMD 1101 receives the composite image based on the captured image from the image processing apparatus 1103 may be measured, and the operation delay may be obtained based on the time T. For example, letting B be the drawing rate of the composite image in the image processing apparatus 1103, (TB) may be obtained as the operation delay. Alternatively, the user may input the operation delay using an operation device 1104. In any case, information representing the operation delay is sent to the HMD 1101 and used to calculate the shift amount.

As described above, according to this embodiment, it is possible to provide the arrangement for reducing even the delay in the system, in addition to the arrangements according to the first to third embodiments, and reduce motion sickness. Note that some or all of the embodiments and modifications described above may appropriately be combined. In addition, some or all of the embodiments and modifications described above may selectively be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-075619, filed Apr. 10, 2018, which is hereby incorporated by reference herein in its entirety.

What is claimed is:
1. An image display apparatus comprising:
one or more processors; and
one or more memories storing codes that, when executed by the one or more processors, cause the image display apparatus to:
determine whether a similarity between a frame image and an immediately preceding frame image that is a frame image one frame before the frame image is not less than a predetermined value;
increment a count value by one when the similarity between the frame image and the immediately preceding frame image is not less than the predetermined value;
set, in the count value, a continuation count of continuously determining that the similarity is not less than the predetermined value up to the immediately preceding frame image when the similarity between the frame image and the immediately preceding frame image is less than the predetermined value;
in a case in which the count value is not 0, generate a corrected frame image in which each pixel of the frame image is shifted by a shift amount according to the count value, and display the corrected frame image as a display image on a display screen of the image display apparatus; and in a case in which the count value is 0, display the frame image as the display image on the display screen of the image display apparatus.

2. The apparatus according to claim 1, wherein in the case in which the count value is not 0, the codes further cause the image display apparatus to obtain an integrated value by integrating past orientation change amounts in a number being based on the count value from recent orientation change amounts in a history of the orientation change amounts of the image display apparatus, and obtain the shift amount based on the integrated value.

3. The apparatus according to claim 1, the codes further cause the image display apparatus to obtain an enlargement/reduction ratio in accordance with a movement of the image display apparatus and perform enlargement/reduction of the display image in accordance with the obtained enlargement/reduction ratio.

4. The apparatus according to claim 1, the codes further cause the image display apparatus to obtain a captured image of a physical space, wherein the frame image is a composite image of a virtual space image generated based on a position and orientation of the image display apparatus and the captured image.

5. The apparatus according to claim 1, wherein the frame image is a virtual space image generated based on a position and orientation of the image display apparatus.

6. The apparatus according to claim 1, wherein the corrected frame image is generated by shifting each pixel of the frame image based on an orientation change amount of the image display apparatus between time of capturing of an image and time of reception of the frame image generated based on the captured image.

7. The apparatus according to claim 1, wherein a part of the display image is displayed.

8. The apparatus according to claim 1, wherein the image display apparatus comprises a head mounted display.

9. The apparatus according to claim 1, wherein it is determined whether a similarity between a predetermined region in the frame image and a predetermined region in the immediately preceding frame image that is the frame image one frame before the frame image is not less than a predetermined value.

10. An image display method performed by an image display apparatus, comprising:

determining whether a similarity between a frame image and an immediately preceding frame image that is a frame image one frame before the frame image is not less than a predetermined value;

incrementing a count value by one when the similarity between the frame image and the immediately preceding frame image is not less than the predetermined value;

setting, in the count value, a continuation count of continuously determining that the similarity is not less than the predetermined value up to the immediately preceding frame image when the similarity between the frame image and the immediately preceding frame image is less than the predetermined value;

in a case in which the count value is not 0, generating a corrected frame image in which each pixel of the frame image is shifted by a shift amount according to the count value, and display the corrected frame image as a display image on a display screen of the image display apparatus; and in a case in which the count value is 0, displaying the frame image, as the display image on the display screen of the image display apparatus.

11. The method according to claim 10, wherein in the generating, in the case in which the count value is not 0, an integrated value is obtained by integrating past orientation change amounts in a number being based on the count value from recent orientation change amounts in a history of the orientation change amounts of the image display apparatus, and the shift amount is obtained based on the integrated value.

12. The method according to claim 10, further comprising obtaining an enlargement/reduction ratio in accordance with a movement of the image display apparatus and performing enlargement/reduction of the display image in accordance with the obtained enlargement/reduction ratio.

13. The method according to claim 10, wherein the image display apparatus further comprises an image capturing unit configured to capture a physical space, and the frame image is a composite image of a virtual space image generated based on a position and orientation of the image display apparatus and a captured image obtained by the image capturing unit.

14. The method according to claim 10, wherein the frame image is a virtual space image generated based on a position and orientation of the image display apparatus.

15. The method according to claim 10, wherein in the generating, each pixel of the frame image is shifted based on an orientation change amount of the image display apparatus between time of capturing of an image and time of reception of the frame image generated based on the captured image.

16. The method according to claim 10, wherein in the determining, it is determined whether a similarity between a predetermined region in the frame image and a predetermined region in the immediately preceding frame image that is the frame image one frame before the frame image is not less than a predetermined value.

* * * * *